(12) United States Patent
Libori et al.

(10) Patent No.: US 6,892,018 B2
(45) Date of Patent: May 10, 2005

(54) MICRO-STRUCTURED OPTICAL FIBER

(75) Inventors: Stig Eigil Barkou Libori, Soborg (DK); Jes Broeng, Birkerod (DK); Anders Overgaard Bjarklev, Roskilde (DK); Christian Rasmussen, Naestved (DK); Erik Knudsen, Koebenhavn N (DK)

(73) Assignee: Crystal Fibre A/S, Birkerod (DK)

( * ) Notice: Subject to any disclaimer, the term of this patent is extended or adjusted under 35 U.S.C. 154(b) by 6 days.

(21) Appl. No.: 10/416,502

(22) PCT Filed: Nov. 20, 2001

(86) PCT No.: PCT/DK01/00774

§ 371 (c)(1),
(2), (4) Date: Oct. 22, 2003

(87) PCT Pub. No.: WO02/41050

PCT Pub. Date: May 23, 2002

(65) Prior Publication Data

US 2004/0071423 A1 Apr. 15, 2004

Related U.S. Application Data

(60) Provisional application No. 60/287,728, filed on May 2, 2001.

(30) Foreign Application Priority Data

Nov. 20, 2000 (DK) .................................. PA 2000 01744
May 2, 2001 (DK) .................................. PA 2001 00691

(51) Int. Cl.$^7$ ............................ G02B 6/02; G02B 6/22; G02B 6/20; G02B 6/16
(52) U.S. Cl. ......................... 385/127; 385/147; 65/428
(58) Field of Search ................................. 385/125, 127, 385/123, 126; 65/385, 428, 435

(56) References Cited

U.S. PATENT DOCUMENTS

| | | | | |
|---|---|---|---|---|
| 5,155,792 A | | 10/1992 | Vali et al. .................... | 385/125 |
| 5,802,236 A | * | 9/1998 | DiGiovanni et al. ........ | 385/127 |
| 6,334,019 B1 | * | 12/2001 | Birks et al. ................. | 385/125 |
| 6,539,155 B1 | | 3/2003 | Broeng et al. .............. | 385/125 |
| 6,792,188 B2 | * | 9/2004 | Libori et al. ................ | 385/125 |
| 2001/0028775 A1 | | 10/2001 | Hasegawa et al. .......... | 385/127 |
| 2002/0061176 A1 | | 5/2002 | Libori et al. ................ | 385/125 |
| 2002/0061178 A1 | * | 5/2002 | Libori et al. ................ | 385/125 |
| 2004/0052484 A1 | | 3/2004 | Broeng et al. .............. | 385/125 |

FOREIGN PATENT DOCUMENTS

| | | |
|---|---|---|
| EP | 0 520 653 | 12/1992 |
| EP | 0 810 453 | 12/1997 |
| EP | 1 130 427 | 9/2001 |
| EP | 1 128 195 | 1/2003 |
| WO | 99/00685 | 1/1999 |
| WO | WO 99/64903 | 12/1999 |
| WO | 99/64903 | 12/1999 |
| WO | 99/64904 | 12/1999 |
| WO | WO 99/64904 | 12/1999 |
| WO | 00/16141 | 3/2000 |
| WO | 01/88578 | 11/2001 |
| WO | 01/96919 | 12/2001 |
| WO | 02/041050 | 5/2002 |

OTHER PUBLICATIONS

T.A. Birks et al., "Full 2–D photonic bandgaps in silica/air structures", Electronics Letters, vol. 31, No. 22, pp. 1941–1943, (Oct. 1995).

J.C. Knight et al., "Pure Silcia Single–Mode Fibre with Hexagonal Photonic Crystal Cladding", Proceedings of OFC, pp. PD3–1 –PD3–5, (Feb. 1996).

Jes Broeng et al., "Waveguidance by the photonic Bandgap effect in Optical fibres", J. Opt. A., vol. 1, 1999, pp. 477–482.

J.C. Knight et al., "Properties of photonic crystal fiber and the effective index model", J. Opt. Soc. Am., vol. 15, No. 3, 1998, pp. 748–752.

Tanya M. Monro et al., "Holey fibers with random cladding distributions", Optics Letters, vol. 25, No. 4, 2000, pp. 206–208.

J. Lekner, "Omnidirectional reflection by multilayer dielectric mirrors", J. Opt. A., vol. 2, 2000, pp. 349–352.

D.N. Chigrin et al., "All–Dielectric One–Dimensional Periodic Structures for Total Omnidirectional Reflection and Partial Spontanous Emission Control", Lightwave Technol., vol. 17, No. 11, Nov. 1999, pp. 2018–2024.

J. Marcou et al., "Monmode Photonic Band Gap Fibers For Dispersion Shifting Towards Short Wavelengths", ECOC'99 Conference, vol. 1, 1999, pp. 24–25.

(Continued)

*Primary Examiner*—Akm Enayet Ullah
(74) *Attorney, Agent, or Firm*—Jacobson Holman PLLC

(57) ABSTRACT

A microstructured fiber having a cladding comprising a number of elongated features that are arranged to provide concentric circular or polygonial regions surrounding the fiber core. The cladding comprises a plurality of concentric cladding regions, at least some of which comprising cladding features. Cladding regions comprising cladding features of a relatively low index type are arranged alternatingly with cladding regions of a relatively high index type. The cladding features are arranged in a non-periodic manner when viewed in a cross section of the fiber. The cladding enables waveguidance by photonic bandgap effects in the fiber core. An optical fiber of this type may be used for light guidance in hollow core fibers for high power transmission. The special cladding structure may also provide strong positive or negative dispersion of light guided through the fiber-making the fiber useful for telecommunication applications.

61 Claims, 11 Drawing Sheets

OTHER PUBLICATIONS

T. Kawanishi et al., "Coaxial periodic optical waveguide", Optics Express, vol. 7, No. 1, 2000, pp. 10–22.

M. Ibanescu et al., "An All–Dielectric Coaxial Waveguide", Science, vol. 289, Jul. 2000, pp. 415–419.

Yoel Fink et al., "Guilding Optical Light in Air Using an All–Dielectric Structure", J. Lightwave Technol., vol. 17, No. 11, Nov. 1999, pp. 2039–2041.

Jes Broeng et al., "Photonic Crystal Fibers: A New Class of Optical Waveguides", Optical Fiber Technology, vol. 5, 1999, pp. 305–330.

R. F. Cregan et al., "Single–Mode Photonic Band Gap Guidance of Light in Air", Science, vol. 285, 1999, pp. 1537–1539.

* cited by examiner

MICRO-STRUCTURED OPTICAL FIBER

This application is a 371 of PCT/DK01/00774 Nov. 20, 2001 which claims benefit of 60/287,728 May 2, 2001.

FIELD OF THE INVENTION

The present invention relates to electromagnetic waveguides, especially optical fibres, having micro-structures in cladding region(s).

BACKGROUND OF THE INVENTION

Optical fibre transmission systems are currently going through a tremendous development, and numerous new applications appear within the area of multi-channel optical communications. These new applications are typically based on new functionalities in the optical fibre components, and one of the interesting developments within the past 4–5 years has been the appearance of "photonic crystal" or "photonic bandgap" fibres as described in T. A. Birks et al., Electronics Letters, Vol.31 (22), p.1941 (October 1995), and J. C. Knight et al. Proceedings of OFC, PD3-1 (February 1996). Photonic bandgap fibre typically involves a dielectric structure with a refractive index that varies periodically in a cross-section perpendicular to the fibre length axis. The period is in the order of an optical wavelength, and the guiding mechanism due to the photonic bandgap effect is fundamentally different from the total internal reflection, which is the basic principle according to which the optical standard fibres work. According to the Bragg diffraction principle that is used in photonic bandgap fibres, radiation within certain wavelength intervals can only propagate in the longitudinal direction with essentially no lateral leakage.

Photonic bandgap fibres—and photonic crystal fibres—are a special class of the fibres known in literature as micro-structured fibres, which may all exhibit waveguiding properties that are unattainable using conventional fibres. For this reason, intensive research has recently been directed towards this new field as described in a number of references, such as WO 99/64903, WO 99/64904, and Broeng et al. Pure and Applied optics, 1999, pp.477–482, describing such fibres having claddings defining Photonic Band Gap (PBG) structures, and U.S. Pat. No. 5,802,236, Knight et al. J. Opt. Soc. Am. A, Vol.15, No.3, 1998, pp.748–752, and Monro et al. Optics Letters, Vol.25, No.4, 2000, pp.206–208, defining fibres, where the light is transmitted using modified Total Internal Reflection (TIR).

The mentioned descriptions of prior art within the field of micro-structured optical fibres present several aspects of advantageous design of core and cladding regions and the resulting optical properties of the fibres. Many of the descriptions have included fully two-dimensionally periodic cladding regions—for obtaining the photonic bandgap effect—or more relaxed requirements (including the possibility of random hole distribution) needed for the formation of total-internal-reflection like waveguiding in high-index core micro-structured fibres. However, the present inventors have realised that a new class of micro-structured photonic crystal fibres (which we will in this application refer to as semi-periodic fibres) may enhance the broad possibilities of improved functionality even further, as we will describe in the following text.

It is well-known to those skilled in the art that a dielectric mirror can be made as a periodic structure of stacked dielectric layers with alternating high and low refractive index. Total light reflection for any angle of incidence and any polarisation of the incident light can be obtained by proper design (see J. Lekner, J. Opt.A., Vol.2, 2000, pp.349–352, and references herein for theoretical analysis). Experimental demonstrations can be found in D. N. Chigrin et al., J. Lightwave Technol., vol.17, November 1999, pp.2018–2024. It is now quite natural to imagine that a dielectric waveguide can be constructed by folding the dielectric mirror so that an air (or dielectric) core is surrounded by a totally reflecting layered cladding, which confines the guided light. Described in a cylindrical co-ordinate system whose z-axis coincides with the waveguide axis, the refractive index of the cladding has no angular dependence but has a periodic dependence on the radius. These waveguides are in this patent application denoted as "radial-periodic" structures.

The radial-periodic waveguides have several potential advantages compared to traditional optical fibres, whose light guidance is based on total internal reflection at the boundary between the high refractive index core and the low refractive index cladding. The fact that the light propagates in air rather than in a dielectric such as silica holds out the prospect of reducing both material absorption losses and non-linearities. These phenomena cause serious problems in optical communication systems. Furthermore, it is expected that the multiplicity of design parameters (e.g., refractive indices and dimensions of layers) will make it possible to design waveguides, which closely match even complex design goals as for instance elaborately specified dispersion properties. Finally, the radial confinement of the light can be made much stronger in radial-periodic waveguides than in traditional optical fibres. This reduces bending losses and allows for tighter bends.

Several studies reported in the literature (see J. Marcou et al., ECOC'99 Conference, vol.1, 1999, pp.24–25, M. Ibanescu et al. Science, Vol.289, July 2000, pp.415–419, and T. Kawanishi et al., Optics Express, vol.7, 2000, pp.10–22) illustrate the potential of radial-periodic waveguides. They also indicate that severe practical problems must be expected in connection with the production of hollow radial-periodic waveguides. J. Marcou et al., ECOC'99 Conference, vol.1, 1999, pp.24–25 describes a radial-periodic waveguide design that can be obtained using silica with practically obtainable levels of germanium doping. The most notable characteristics of this design is that the zero dispersion wavelength is shifted downwards to the 850 nm range and that the refractive index of the high index layer of the cladding is only 0.6% higher than the index of the low index layer. It is a disadvantage of radial periodic fibres that significantly larger index contrasts cannot be obtained in a traditional fibre production process relying on doping of silica. It is a disadvantage that this waveguide is not hollow but has an un-doped core with slightly lower refractive index than the cladding layers. The potential advantages of the hollow core waveguides concerning properties such as loss and non-linearity are significantly reduced in this case.

The desirable light guidance in the air core of a hollow waveguide requires much higher index contrasts in the cladding. The theoretical study in T. Kawanishi et al., Optics Express, vol.7, 2000, pp.10–22 is a radial-periodic structure with refractive indices of 1.0 and 2.0, whereas the design described by M. Ibanescu et al. (Science, Vol.289, July 2000, pp.415–419) employs layers with refractive indices as high as 1.6 and 4.6. Experimental verification of hollow waveguides is reported by Y. Fink et al., J. Lightwave Technol., vol.17, November 1999, pp.2039–2041, who transmitted light in the 10 micron region through a 10 cm waveguide made of tellurium and polystyrene. However, in large scale production of radial-periodic hollow waveguides for employment in telecommunication systems, index contrasts of this order of magnitude could turn out to be an insuperable difficulty of large-scale production of semi-periodic hollow waveguides, since it is expected to be very difficult to find the required dielectrics. They must have high index contrasts, low loss, chemical stability and mechanical robustness, and they must furthermore be thermally, chemically and mechanically compatible so that they can be combined in a production process. Moreover it is a disadvantage from an economical point of view that completely new production processes must be developed, if optical waveguides are no longer based on silica.

In connection with the prior art on radial varying fibre cladding structures, it is relevant to note that in European patent application EP 0 810 453 A1 and in U.S. Pat. No. 5,802,236 is described that micro-structured fibres are not limited to fibres with an array of cladding features. EP 0 810 453 A1 and U.S. Pat. No. 5,802,236 describes an alternative micro-structured fibre having circular symmetry, with the core feature surrounded by a multi-layer (exemplarily more than 10 or even 20 layers) cladding, with alternating relatively high and low refractive indices. It is, furthermore, mentioned that the refractive indices and layer thickness are selected such that the structure has a desired effective refractive index profile. For instance, the layer thickness can be chosen such that an inner cladding region has a relatively low effective refractive index, and an outer cladding region that surrounds the inner cladding region has an effective refractive index of value between that of the core region and the inner cladding region. In EP 0 810 453 A1 and in U.S. Pat. No. 5,802,236, it is further described that such a micro-structured fibre can be made, for instance, by drawing from a preform, with the described multilayer cladding formed by e.g., a conventional deposition technique such as MCVD, or by collapsing a multiplicity of glass tubes around the core feature.

It is a disadvantage of the fibre described in EP 0 810 453 A1 and in U.S. Pat. No. 5,802,236, that only homogeneous material is used in the concentric circles forming the alternating relative high and low refractive index cladding, and as described above this results in limited intervals within which the refractive index values of the individual layers may be chosen. It is further a disadvantage that the possibility of using a radial periodic cladding is not considered, such that the radial varying fibres disclosed in EP 0 810 453 A1 and in U.S. Pat. No. 5,802,236 will not allow photonic bandgap guidance of light.

It should, furthermore, be pointed out that EP 0 810 453 A1 also describes a non-periodic micro-structured fibre preform having a silica-rod core feature of diameter 0.718 mm. This rod is surrounded by six silica tubes of inner diameter 0.615 mm and outer diameter 0.718 mm, which in turn are surrounded by more than four layers of silica tubes of inner diameter 0.508 mm and outer diameter 0.718 mm. This preform is overclad with silica tubes selected to yield, after drawing, a desired fibre diameter. It is, however a disadvantage that this fibre design (employing two different hole dimensions) does not have alternating concentrically distributed effective refractive index values, such as it is the case with the semi-periodic fibres disclosed in this application.

The prior art also includes descriptions of waveguides having axially varying structure such as outlined in Patent application WO 00/16141. More specifically WO 00/16141 describes a micro-structured fibre having axial change in density of the cladding layer. controlled through the fraction of the cladding volume that is air or a glass of a composition different from that of the base cladding glass. The axial variation in cladding indices changes the signal mode power distribution, thereby changing key waveguide parameters such as magnitude and sign of dispersion, cut-off wavelength, and zero dispersion wavelength. The description in WO 00/16141 also incorporates cladding layer structures, which contain an array of features, periodic or randomly distributed, comprising a material in place of the pores, and further the core region may be segmented Into two or more portions, for obtaining equivalent index profiles to those normally described in standard fibre technology. In WO 00/16141 it is described how the cladding layer density can be made to alternate from high to low and low to high in adjacent segments along the preform axis (length axis) of the preform by changing the porosity of the cladding layer, and in particular, respective adjacent segments along the preform axis could alternate between a condition in which the cladding layer is essentially free of pores and a condition in which the cladding layer contain pores. The parameters provided in WO 00/16141 describe fibres with pitches from about 0.4 $\mu$m to 20 $\mu$m, and a typical outside diameter about 125 $\mu$m. In the cases, where the filaments are obtained through a glass of different composition compared to the base glass, it is specifically mentioned that if one wishes the filament containing cladding layer to interact with light in the manner of a photonic crystal having a full band gap, the filament size and spacing should be such to accommodate a pitch in the range of about 0.4 $\mu$m to 5 $\mu$m, and the respective dielectric constants of the matrix glass and the glass comprising the columns of glass contained therein should differ by about a factor of three. Although several segmented core designs are discussed in WO 00/16141, it is a disadvantage that these fibre designs does not have alternating concentrically distributed effective refractive index values throughout the cladding, such as it is the case with the semi-periodic fibres disclosed in this application, and although photonic bandgap guidance is mentioned, no detailed specifications besides the pitches in the range of about 0.4 $\mu$m to 5 $\mu$m are provided.

Glossary and Definitions:

For micro-structures, a directly measurable quantity is the so-called filling fraction that is the volume of disposed features in a micro-structure relative to the total volume of a micro-structure. For fibres that are invariant in the axial fibre direction, the filling fraction may be determined from direct inspection of the fibre cross-section.

In this application we distinguish between "refractive index", "geometrical index" and "effective index". The refractive index is the conventional refractive index of a homogeneous material. The geometrical index of a structure is the geometrically weighted refractive index of the structure. As an example, a structure consisting of 40% air (refractive index=1.0) and 60% silica (refractive index≈1.45) has a geometrical index of 0.4×1.0+0.6×1.45= 1.27. The procedure of determining the effective refractive index, which for short may be referred to as the effective index, of a given micro-structure at a given wavelength is well-known to those skilled in the art (see e.g., Joannopoulos et al., "Photonic Crystals", Princeton University Press, 1995 or Broeng et al., Optical Fiber Technology, Vol. 5, pp.305–330, 1999).

Usually, a numerical method capable of solving Maxwell's equation on full vectorial form is required for accurate determination of the effective indices of micro-structures. The present invention makes use of employing such a method that has been well-documented in the literature (see previous Joannopoulos-reference). In the long-wavelength regime, the effective index is roughly identical to the weighted average of the refractive indices of the constituents of the material, that is, the effective index is close to the geometrical index in this wavelength regime.

By radial periodic fibres is meant fibres whose refractive index may be described as concentric circles. Such fibres may be described as fibres with a one-dimensional periodicity using semi-polar coordinates as understood by those skilled in the art. By micro-structured fibres is meant fibres with localised features (such as holes or holes containing or filled up with a material having a refractive index that differs from the refractive index of the region containing the feature) in the cladding region, which features may have cross-sectional dimensions in the order of 10 µm or less in a cross section perpendicular to an axial direction of the fibre. Thus radial periodic fibres, two-dimensionally periodic fibres (whose cladding features define a two-dimensional lattice structure), random cladding structures (see WO 00/16141) and semi-periodic fibres (to be defined in the following) may all be termed micro-structured fibres.

In the following description the term "non-periodic" is used in connection with arrangements of features in the cladding region. Here, by using the term "non-periodic" is meant that the whole cladding structure of a fibre cannot be periodic in two independent directions- or stated in terms understood by those skilled in the art: the whole cladding structure cannot be generated from a unit cell (unit cells are used to describe periodic structures). In simple one-dimensional structures the unit cell has the size of one period. Likewise, unit cells for two-dimensional periodic structures have the size of the period. When the structure is periodic in two dimensions, the unit cell becomes an area, such that the boundary of the unit cell on one side describes the periodicity in one independent direction, while the boundary of another side of the unit cell describes the period in another independent direction. It should be understood that the term "non-periodic" also covers cladding structures in which the cladding features differs in some property as for example the cross-sectional diameter.

In particular, embodiments of the present invention allow for parts of the cladding structure to be periodic, while the cladding structure as a whole may be non-periodic. Naturally, this may refer to the part of the cladding structure, which is important for the guided modes only. Thus, when the cladding features in relation to the micro-structured cladding region as a whole are arranged in a non-periodic arrangement, the term non-periodic may refer to that the cladding features are arranged irregularly or differ in some property, e.g. diameter, when looking at the whole micro-structured cladding region.

SUMMARY OF THE INVENTION

The main problem to be solved by the invention is to be able to guide light in micro-structured fibres, while obtaining improved polarisation and dispersion properties (the fibres according to the invention may be designed only to guide light in a single mode in the relevant wavelength region(s)). The fibres are aimed at applications at visible to near-infrared wavelengths. In a preferred embodiment, the fibre may guide light mainly within a low index core (e.g., a hollow core-region).

As discussed in the previous section, optical guidance—mainly within a hollow core region—has already been demonstrated in micro-structured fibres, where the refractive index of the cladding region is two-dimensionally periodically distributed (see e.g. Cregan R. F., Mangan B. J., Knight J. C., Birks T. A., Russell P. St. J., Roberts P. J., and Allan D. C. "Single-mode photonic band gap guidance of light in air". Science, 285:1537–9, 1999) and in radial periodic fibres (see Y. Fink et al). A periodic cladding allows the formation of forbidden energy levels of the photons in the cladding: photonic bandgaps, PBGs. As understood by those skilled in the art, photonic bandgaps are an optical analogue to the electronic bandgaps of periodic semiconductor crystals.

Relating to micro-structured fibres with a hollow core, guidance is possible only if the guided mode for the guiding wavelengths has a propagation constant, which falls within a photonic bandgap of the surrounding cladding structure (assuming the fibre is invariant in the guiding (the longitudinal) direction). Only then is light not able to escape into the cladding region, and is, therefore, guided along the fibre. It has, consequently, been assumed that light may only be guided within a hollow core, if the cladding structure is strictly periodic.

It is, however, recognised by the inventors that the periodicity need not be two-dimensional, for the cladding to support a guided mode within a hollow core. The important quality is a two- or three-dimensional photonic bandgap. As has been proven (see e.g., Kawanishi T., Isutsu M. "Coaxial periodic optical waveguide". Optics Express, 7:10–22, 1, 2000), this allows guidance of light within a hollow core-region fibre with a circular symmetric cladding structure (a radial periodic structure, which may be described as a one-dimensionally periodic structure using semi-polar coordinates). The present invention may provide for fibres, which are not strictly periodic structures in one, two or three dimensions. Still, the fibres does have a micro structured cladding, which in some respects may be periodic, and the present invention therefore provides fibre solutions, which distinguish themselves from micro-structured fibres with arbitrary non-periodic cladding structures (see e.g. Monro et al., Optics Letters, Vol.25, No.4, Feb. 15, 2000, pp.206–208). Micro-structured fibres with a non-periodic cladding structure have already been applied for in patents (see e.g. U.S. Pat. No. 5,155,792 and EP 0 810 453 A1, U.S. Pat. No. 5,802,236). The structures revealed in these non-periodic patent applications are non-periodic structures with special optical properties. This is also the case for the fibres of the present invention, where another class of micro-structured fibres, which are not strictly periodic are disclosed. According to specific embodiments of the present invention, there is provided structures, which allow the formation of photonic bandgaps in the cladding structure (as opposed to the structures in U.S. Pat. No. 5,155,792 and EP 0 810 453 A1, U.S. Pat. No. 5,802,236, or Monro et al., Optics Letters, Vol.25, No.4, Feb. 15, 2000, pp.206–208), while the structures are not periodic (as opposed to the structures disclosed in e.g., Cregan et al, and by Kawanishi et al). We may refer to the non-periodic structures of the present invention as semi-periodic structures to emphasize that the structures physically behave as periodic structures, while the refractive index of the structure is in fact non-periodic.

According to the present invention there is provided an optical fibre for transmitting light; said optical fibre having an axial direction and a cross-section perpendicular to said axial direction, said optical fibre comprising: a core region, and a micro-structured cladding surrounding said core region, wherein the cladding comprises a number of successive concentric cladding regions encompassing said core region, each of said concentric cladding regions having inner and outer boundaries of substantially similar cross-sectional shape and a substantially constant background refractive index;

a first plurality of the concentric cladding regions being of a low index type, each of said first cladding regions comprising a plurality of spaced apart first cladding features elongated in the fibre axial direction, each said first cladding feature having a refractive index being lower than the background refractive index of the cladding region comprising the cladding feature, and each said first cladding feature having a largest cross-sectional dimension being smaller than or equal to the distance between the inner and the outer boundary of the cladding region comprising the cladding feature, whereby the geometrical index of a cladding region of the first type is lowered;

a second plurality of the concentric cladding regions being of a high index type having a geometrical index being higher than the geometrical index of each of the first plurality of cladding regions; and said high index type and low index type cladding regions being alternating arranged so that each low index region at its outer boundary is encompassed by a high index region. Here, it should be noted that the present invention also covers embodiments wherein the above mentioned term "geometrical index" is substituted by the term "effective index", due to the fact that both the geometrical index and the effective index are changed by the insertion of the cladding features.

In the preferred embodiment of the invention, the arrangement of cladding features in relation to the micro-structured cladding as a whole is a non-periodic arrangement in the cross-sectional plane. Here, it should be understood that the second cladding regions being of a high index type may also comprise a plurality of spaced apart cladding features, referred to as second cladding features, while still being of a high index type. Thus, said arrangement of cladding features may comprise any cladding features of the first and second cladding regions, while still being a non-periodic arrangement in relation to the micro-structure cladding as a whole.

It is preferred that the largest cross-sectional dimension of the first cladding features and the distance between the inner and the outer boundary of the cladding region comprising the cladding feature are considered in the same cross section of the fibre perpendicular to its axial direction. It is preferred that the cross section is substantially identical throughout the length of the optical fibre.

It is an advantage of the preferred embodiment of the present invention that it allows the formation of photonic bandgaps within the cladding region, even if the cladding region is not periodic. Like the periodic cladding structures described by Cregan et al. the cladding structure may consist of only a number of cladding holes embedded within a silica matrix. What is unique about the cladding structures of the present invention is that the holes need not be distributed periodically in the cladding for photonic bandgaps to appear. The cladding structures of the present invention may be understood as a sequence of radial alternating high and low effective index concentric rings. Within the low effective index rings, a number of low index features (typically air-holes) are placed. These lowers the effective index or the geometrical index of the particular ring. These features need therefore not to be placed periodically within the ring as long as the effective index of the ring or the geometrical index is almost independent of the angle around the center of the fibre. Typically this implies that the features should be smaller than the wavelength to be guided by the fibre, and/or that the 'bridges' of background material between the features is smaller than the wavelengths to be guided by the fibre.

When the spaced apart cladding features do not define a lattice structure in one, two or three dimensions, the refractive index of the cladding structure is not periodic in the usual sense of the word. Still, the concentric shapes with low effective index, which may be formed in a near radial periodic manner by the usage of low refractive index spaced apart features may have some resemblance with radial periodic fibres. Since such rings with low effective index will not appear in fibres with randomly distributed refractive index, we may choose to term the fibres disclosed in this application semi-periodic fibres to stress their intermediary nature between random and periodic cladding structures. The present invention, therefore, also discloses a manner of obtaining photonic bandgaps without a periodic dielectric structure. The inventors have thus realized that not only the refractive index, as usually assumed, but also the effective index or the geometrical index may be used to form photonic bandgaps in micro-structured fibres. From the above discussion it may be understood that the present invention covers embodiments in which the largest cross-sectional dimension of any one of the spaced apart cladding features is smaller than a predetermined wavelength of light to be guided by said fibre. Here, the ratio of said largest cross-sectional dimension divided by said predetermined wavelength is preferred to be below 0.8, such as below 0.6, such as below 0.5, such as below 0.4, such as below 0.3, such as below 0.2, or such as below 0.1.

It is preferred that the radial width of the concentric cladding regions has a variation below certain limits in order to reduce the angular variation of the effective or geometrical index. Thus, according to an embodiment of the invention, any distance L from the inner boundary of a high index region to the outer boundary of a following low index region taken along a radial direction in the cross-sectional plane may be larger than or equal to a minimum length Lmin and below or equal to a maximum length Lmax, where Lmax is two times Lmin. It is also preferred that the cladding regions are dimensioned so that any value of L taken along any radial direction is larger than 2 times, such as larger than 3 times, such as larger than 4 times a predetermined wavelength of light to be guided by said fibre.

According to the present invention there is also provided an embodiment in which at least 6 spaced apart high index type cladding regions each may have a radial width being larger than half the wavelength of a predetermined wavelength of light to be guided by the fibre, while said radial width is smaller than the predetermined wavelength of light to be guided by the fibre. According to an embodiment of the invention, it is preferred that at least 6 spaced apart high index type cladding regions each have a radial width being larger than 0.5 $\mu$m, such as larger than 0.6 $\mu$m, such as larger than 0.7 $\mu$m, such as larger than 0.8 $\mu$m, such as larger than 0.9 $\mu$m, such as larger than 1.0 $\mu$m, such as larger than 1.1 $\mu$m, such as larger than 1.2 $\mu$m, such as larger than 1.3 $\mu$m.

According to a further embodiment of the invention, at least 6 spaced apart low index type cladding regions each may have a radial width being larger than a predetermined wavelength of light to be guided by the fibre, while the radial width is smaller than three times the predetermined wavelength of light to be guided by the fibre. It is also within a preferred embodiment that at least 6 spaced apart low index type cladding regions each have a radial width being larger than 1.5 $\mu$m, such as larger than 2.0 $\mu$m, such as larger than 2.5 $\mu$m, such as larger than 3.0 $\mu$m, such as larger than 3.5 $\mu$m, such as larger than 4.0 $\mu$m, such as larger than 4.5 $\mu$m.

According to an embodiment of the invention, in which the optical fibre is manufactured for guidance of light with a predetermined wavelength, λ, said guided light having an effective mode index, β/k, where β is the propagation constant of the guided mode, and where k is the free-space wave number of said predetermined wavelength, it is preferred that for each of at least 6 spaced apart high index type cladding regions the radial width is in the range of 0.9–1.1 times $$\frac{(1+2m)\frac{\lambda}{4}}{\sqrt{n_{\text{eff\_high}}^2 - \left(\frac{\beta}{k}\right)^2}},$$

where $n_{\text{eff\_high}}$ is the effective refractive index of the corresponding high index type cladding region, and m is zero or a predetermined whole positive number. Here, it is preferred that for each of said at least 6 spaced apart high index type cladding regions the radial width is approximately equal to $$\frac{(1+2m)\frac{\lambda}{4}}{\sqrt{n_{\text{eff\_high}}^2 - \left(\frac{\beta}{k}\right)^2}},$$

where $n_{\text{eff\_high}}$ is the effective refractive index of the corresponding high index type cladding region, and m is zero or a predetermined whole positive number. Alternatively, the radial width may be given by the geometrical index so that for each of at least 6 spaced apart high index type cladding regions the radial width is in the range of 0.9–1.1 times $$\frac{(1+2m)\frac{\lambda}{4}}{\sqrt{n_{\text{ge\_high}}^2 - \left(\frac{\beta}{k}\right)^2}},$$

where $n_{\text{ge\_high}}$ is the geometrical index of the corresponding high index type cladding region, and m is zero or a whole positive number. Also here it is preferred that for each of said at least 6 spaced apart high index type cladding regions the radial width is approximately equal to $$\frac{(1+2m)\frac{\lambda}{4}}{\sqrt{n_{\text{ge\_high}}^2 - \left(\frac{\beta}{k}\right)^2}},$$

where $n_{\text{ge\_high}}$ is the geometrical index of the corresponding high index type cladding region, and m is zero or a whole positive number.

For the above expressions of the radial width it should be understood that each of the 6 high index cladding regions may have a different effective refractive index or geometrical index resulting in a corresponding different value or range of values for the radial width. Similarly, the number m may differ for each of the at least 6 high index cladding regions, which may also result in different radial widths. However, it is preferred that the number m is the same for each of said at least 6 spaced apart high index type cladding regions. It is also preferred that the effective refractive index or geometrical index is substantially the same for each of said at least 6 spaced apart high index type cladding regions. Preferably, for each of said at least 6 spaced apart high index type cladding regions, m may be selected from the numbers 0, 1, 2 or 3.

It is also within an embodiment of the invention that a first part of the spaced apart high index type cladding regions has a radial width according to a first value of the above described number m, while a second part of the high index type cladding regions has a radial width according to a second value of the number m. Here, the first value of m may be larger than the second value of m, and the first part of high index type cladding regions may be arranged closer to the core region than the second part of high index type cladding regions.

When an optical fibre of the present invention is manufactured for guidance of light with a predetermined wavelength, λ, said guided light having an effective mode index, β/k, where β is the propagation constant of the guided mode, and where k is the free-space wave number of said predetermined wavelength, it is also within a preferred embodiment that for each of at least 6 spaced apart low index type cladding regions the radial width is in the range of 0.9–1.1 times $$\frac{(1+2m)\frac{\lambda}{4}}{\sqrt{n_{\text{eff\_low}}^2 - \left(\frac{\beta}{k}\right)^2}},$$

where $n_{\text{eff\_low}}$ is the effective refractive index of the corresponding low index type cladding region, and m is zero or a predetermined whole positive number. Here, it is preferred that for each of said at least 6 spaced apart low index type cladding regions the radial width is approximately equal to $$\frac{(1+2m)\frac{\lambda}{4}}{\sqrt{n_{\text{eff\_low}}^2 - \left(\frac{\beta}{k}\right)^2}},$$

where $n_{\text{eff\_low}}$ is the effective refractive index of the corresponding low index type cladding region, and m is zero or a predetermined whole positive number. Alternatively, the radial width may also here be given by the geometrical index so that for each of at least 6 spaced apart low index type cladding regions the radial width is in the range of 0.9–1.1 times $$\frac{(1+2m)\frac{\lambda}{4}}{\sqrt{n_{\text{ge\_low}}^2 - \left(\frac{\beta}{k}\right)^2}},$$

where $n_{\text{ge\_low}}$ is the geometrical index of the corresponding low index type cladding region, and m is zero or a whole positive number. Also here it is preferred that for each of said at least 6 spaced apart low index type cladding regions the radial width is approximately equal to $$\frac{(1+2m)\frac{\lambda}{4}}{\sqrt{n_{\text{ge\_low}}^2 - \left(\frac{\beta}{k}\right)^2}},$$

where $n_{\text{ge\_low}}$ is the geometrical index of the corresponding low index type cladding region, and m is zero or a whole positive number.

For the above expressions of the radial width it should be understood that each of the at least 6 low index cladding regions may have a different effective refractive index or geometrical index resulting in a corresponding different value or range of values for the radial width. Similarly, the number m may differ for each of the at least 6 low index cladding regions, which may also result in different radial widths. However, it is preferred that the number m is the same for each of said at least 6 spaced apart low index type cladding regions. It is also preferred that for each of said at least 6 spaced apart low index type cladding regions, m is selected from the numbers 0, 1, 2 or 3.

It is also within an embodiment of the invention that a first part of the spaced apart low index type cladding regions has a radial width according to a first value of the above described number m, while a second part of the low index type cladding regions has a radial width according to a second value of the number m.

Although different optical fibres may be dimensioned for guiding light of different wavelengths, it is preferred that the predetermined wavelength is in the range of 1.4–1.6 µm, such as around 1.55 µm.

Consider a spaced apart high index type cladding region, and an adjacent neighbouring low index type cladding region, which pair of spaced apart cladding regions, we will refer to as a cladding region pair. According to an embodiment of the invention, in which the optical fibre is manufactured for guidance of light with a predetermined wavelength, $\lambda$, said guided light having an effective mode Index, $\beta/k$, where $\beta$ is the propagation constant of the guided mode, and where k is the free-space wave number of said predetermined wavelength, it is preferred that for each of at least 6 spaced apart cladding region pairs, the radial width of each of the cladding region pairs, is in the range of 0.9–1.1 times $$\left( \frac{(1+2m)\frac{\lambda}{4}}{\sqrt{n_{\text{eff\_high}}^2 - \left(\frac{\beta}{k}\right)^2}} + \frac{(1+2n)\frac{\lambda}{4}}{\sqrt{n_{\text{eff\_low}}^2 - \left(\frac{\beta}{k}\right)^2}} \right),$$

where $n_{\text{eff\_high}}$ is the effective refractive index of the corresponding high index type cladding region and $n_{\text{eff\_low}}$ is the effective refractive index of the corresponding low index type cladding region, and m is zero or a predetermined whole positive number, and n is zero or a predetermined whole positive number. Here, it is preferred that for each of said at least 6 spaced apart cladding region pairshigh index type cladding regions the radial width is approximately equal to $$\left( \frac{(1+2m)\frac{\lambda}{4}}{\sqrt{n_{\text{eff\_high}}^2 - \left(\frac{\beta}{k}\right)^2}} + \frac{(1+2n)\frac{\lambda}{4}}{\sqrt{n_{\text{eff\_low}}^2 - \left(\frac{\beta}{k}\right)^2}} \right).$$

Consider a spaced apart high index type cladding region, and an adjacent neighbouring low index type cladding region, which pair of spaced apart cladding regions, we will refer to as a cladding region pair. According to an embodiment of the invention, in which the optical fibre is manufactured for guidance of light with a predetermined wavelength, $\lambda$, said guided light having an effective mode index, $\beta/k$, where $\beta$ is the propagation constant of the guided mode, and where k is the free-space wave number of said predetermined wavelength, it is preferred that for each of at least 6 spaced apart cladding region pairs, the radial width of each of the cladding region pairs, is in the range of 0.9–1.1 times $$\left( \frac{(1+2m)\frac{\lambda}{4}}{\sqrt{n_{\text{ge\_high}}^2 - \left(\frac{\beta}{k}\right)^2}} + \frac{(1+2n)\frac{\lambda}{4}}{\sqrt{n_{\text{ge\_low}}^2 - \left(\frac{\beta}{k}\right)^2}} \right),$$

where $n_{\text{ge\_high}}$ is the effective refractive index of the corresponding high index type cladding region and $n_{\text{ge\_low}}$ is the effective refractive index of the corresponding low index type cladding region, and m is zero or a predetermined whole positive number, and n is zero or a predetermined whole positive number. Here, it is preferred that for each of said at least 6 spaced apart cladding region pairshigh index type cladding regions the radial width is approximately equal to $$\left( \frac{(1+2m)\frac{\lambda}{4}}{\sqrt{n_{\text{ge\_high}}^2 - \left(\frac{\beta}{k}\right)^2}} + \frac{(1+2n)\frac{\lambda}{4}}{\sqrt{n_{\text{ge\_low}}^2 - \left(\frac{\beta}{k}\right)^2}} \right).$$

For the above expressions of the radial width of the cladding region pairs it should be understood that each of the high index regions and low index regions of the at least 6 cladding regions pairs may have a different effective refractive index or geometrical index resulting in a corresponding different value or range of values for the radial width of the cladding region pairs. Similarly, the number m may differ for each of the at least 6 high index cladding regions, and the number n may differ for each of the at least 6 low index cladding regions, which may also result in different radial widths of the cladding region pairs. However, it is preferred that the number m is the same for each of said at least 6 spaced apart high index type cladding regions, and it is preferred that the number n is the same for each of said at least 6 spaced apart low index type cladding regions. It is also preferred that for each of said at least 6 spaced apart high index type cladding regions, m is selected from the numbers 0, 1, 2 or 3, and that for each of said at least 6 spaced apart low index type cladding regions, n is selected from the numbers 0, 1, 2 or 3

In the above discussion is referred to embodiments of the invention having at least 6 spaced apart high index cladding regions and/or at least 6 spaced apart low index cladding regions. It should be understood that the present invention also covers embodiments having at least 8, such as at least 10, such as at least 12, such as at least 14, or such as at least 20 spaced apart high index cladding regions and/or spaced apart low index cladding regions.

According to an embodiment of the invention, each of the second plurality of concentric cladding regions are made of a solid material with no cladding features to thereby obtain high index type cladding regions. Here, each of said second plurality of cladding regions may be made of a solid material having a substantially constant refractive index.

However, as already mentioned, according to another embodiment of the invention, at least one or each of said second cladding regions may comprise a plurality of spaced apart second cladding features elongated in the fibre axial direction. Here, each said second cladding feature may have a refractive index being different from the background refractive index of the cladding region comprising the cladding feature, and each said second cladding feature may have a largest cross-sectional dimension being smaller than or equal to the distance between the inner and the outer boundary of the cladding region comprising the cladding feature. The second cladding features may have a refractive index being lower than the background refractive index of the cladding region comprising the cladding feature. However, the present invention also covers embodiments in which the second cladding features have a refractive index being higher than the background refractive index of the cladding region comprising the cladding feature.

It is preferred that the first cladding features for each of said first cladding regions occupy a ratio of the area of the, first cladding region being larger than or equal to a minimum ratio Fcl1, the second cladding features for each of said second cladding regions occupy a ratio of the area of the second cladding region being smaller than or equal to a maximum ratio Fcl2, and Fcl2 is smaller than Fcl1. Furthermore, the first cladding features and the second cladding features may have substantially the same refractive index.

According to an embodiment of the invention, the first cladding features and the second cladding features may have substantially the same cross-sectional dimensions. It is preferred that the largest cross-sectional dimension of any one of the spaced apart first or second cladding features is smaller than 5.0 $\mu$m, such as smaller than 2.0 $\mu$m, such as smaller than 1.0 $\mu$m, such as smaller than 0.7 $\mu$m, such as smaller than 0.4 $\mu$m, such as smaller than 0.2 $\mu$m, such as smaller than 0.1 $\mu$m.

In order to reduce the variations of the geometrical or effective index within a cladding region having cladding features, it is preferred that the spaced apart first cladding features within a given first cladding region are spaced at substantially equal distances. Preferably, the centres of the plurality of spaced apart first cladding features are arranged essentially at even distances within each or at least part of said first cladding regions. It is also preferred that the first cladding features are arranged in a locally two-dimensionally periodic structure within each or at least part of said first cladding regions.

When there are spaced apart second cladding features within a given second cladding region it is preferred that these second cladding features are spaced at substantially equal distances. Preferably, the centres of the plurality of spaced apart second cladding features are arranged essentially at even distances within each or at least part of said second cladding regions. Also here, it is preferred that the second cladding features are arranged in a locally two-dimensionally periodic structure within each or at least part of said second cladding regions.

It is preferred that the center of any of the spaced apart first cladding features is situated near the center of another spaced apart first cladding feature at a distance smaller than 5.0 $\mu$m, such as smaller than 2.0 $\mu$m, such as smaller than 1.0 $\mu$m, such as smaller than 0.7 $\mu$m, such as smaller than 0.4 $\mu$m, such as smaller than 0.2 $\mu$m, such as smaller than 0.1 $\mu$m.

The cladding regions may be formed in different shapes, but in a preferred embodiment the shape of the inner and outer boundaries of the cladding regions is substantially circular or elliptical. Here, the centres of the plurality of spaced apart first cladding features may be arranged essentially on concentric circles or ellipses within said first cladding regions. For embodiments having second cladding features, the centres of the plurality of spaced apart second cladding features may be arranged essentially on concentric circles or ellipses within said second cladding regions.

According to yet another embodiment of the present invention, the shape of the inner and outer boundaries of the cladding regions may be substantially polygonal. Here, the centres of the plurality of spaced apart first and/or second cladding features may be arranged essentially on concentric polygons.

It has already been discussed that it is preferred that the radial width of the concentric cladding regions has a variation below certain limits. Hence, according to an embodiment of the invention, the ratio of the radial widths of the radial widest and the radial most narrow of the concentric cladding regions should be less than 4, such as less than 3, such as less than 2, such as less than 1.5, such as less than 1.2, such as less than 1.1.

The present invention also covers embodiments, wherein the value of the radial widest width of any of the cladding regions divided by a predetermined wavelength to be guided by the fibre is less than 3.0, such as less than 2.0, such as less than 1.5, such as less than 1.0, such as less than 0.5, such as less than 0.3.

The cladding regions may be made of different materials or materials with different background refractive index, as long as the requirement to the variation in high index cladding regions and low index cladding regions is fulfilled. However, it is preferred that each of the concentric cladding regions has the same background refractive index.

For the concentric cladding regions it is preferred that the background material of at least one of the concentric cladding regions is a dielectric material such as silica with a refractive index in the range of 1.43 to 1.49, such as around 1.45.

According to embodiments of the invention, the first and/or second cladding features may be formed by voids. The invention also covers embodiments in which the first and/or second cladding features may contain air or another gas, or contain water, oil, gasoline or another liquid.

For the first or low index cladding regions, it is preferred that each of said cladding regions has a geometrical or effective index being lower than 1.25, such as lower than 1.2, such as lower than 1.15, such as lower than 1.1, such as lower than 1.05.

For the first and the second cladding regions it is also preferred that the geometrical index of the second or high index cladding region with the lowest geometrical index is more than 5% larger than the geometrical index of the first or low index cladding region with the highest geometrical index, such as more than 10% larger, such as more than 20% larger, such as more than 25% larger, such as more than 30% larger, such as more than 35% larger, such as more than 40% larger, such as more than 45% larger.

It is preferred that the core region comprises a hollow core. Here, the hollow core region may contain a vacuum, air or another gas, or contains a liquid.

The present invention may be made from a silica-glass perform. For some applications it may be advantageous to make the fibre from other types of glass or dielectrics, such as polymers or plastics. Other materials than silica glass may offer greater flexibility in the design process, or they may offer new optical qualities, due to a different refractive index, or novel loss or non-linear qualities.

The present invention also covers embodiments wherein the core region contains a dielectric, such as silica glass. Here, the core region may comprise a dielectric such as silica glass doped with a substance selected from the group consisting of erbium, ytterbium, neodymium, thulium and praseodymium. Alternatively, the core region may comprise silica glass having a dopant selected from the group consisting of germania, alumina, phosphorus, titania, boron and fluorine.

For the core region it is preferred that the largest cross-sectional dimension is larger than 1 μm, such as larger than 2 μm, such as larger than 4 μm, such as larger than 8 μm, such as larger than 15 μm, such as larger than 30 μm.

The present invention further provides a method of using an optical fibre according to any of the fibre embodiments of the present invention, wherein the fibre is used in a process involving third order harmonic generation or the reversed process.

It is a further advantage of the fibres of the present invention that they may allow guidance of light in a hollow core and in a single mode in fibres consisting only of silica and air (like the fibres disclosed by Cregan et.al, but opposed to the fibres disclosed by Kawanishi et. al). This greatly facilitates the ease of production, and potentially reduces the propagation loss of the fibre. This advantage is pronounced in the sense that up until now, it has not been described how to realize long lengths of circular symmetric micro structured fibres, which guide light mainly within a hollow core (like e.g. the fibres disclosed in Kawanishi et.al).

A further advantage of the invention is that fibres according to the invention may make it possible to guide light in a mode, which is virtually circularly symmetric. A circular mode reduces coupling losses to standard fibres (because of a better mode overlap, as understood by those skilled in the art), and the circular mode can also be advantageous when considering bending losses (fibres without a preferred bending direction).

A further advantage of the present invention is that the structures of the present invention may allow guided solutions with a very low mode-index, said mode-index being defined as the propagation constant along the fibre divided by the wave-number. In principle, solutions with a mode-index of zero are possible (this is also possible with the fibres disclosed by Kawanishi et. al., but it is impossible with the fibres disclosed by Cregan et al., since no two-dimensional PBGs, with a propagation constant of zero, exist in pure silica/air structures). A localised solution with a mode-index close to zero propagates very slowly. The present inventors have realized that the group velocity of the guided mode, along the fibre, should be equal to or less than the free-space velocity of light multiplied by the mode-index, assuming the mode-index is less than unity. A guided mode with a mode-index of zero, therefore, in principle does not guide light along the fibre, while at the same time light cannot escape in the transverse direction due to the photonic bandgap effect. As a result light is in principle not propagating, or in more practical cases, the light is propagating with an unusual low group velocity. This, however, may only be obtained at discrete wavelengths. In practice, therefore, it is difficult to obtain fibres, which stop the light. The present inventors have realised that it is possible to utilize another quality of guided solutions with a low mode-index: Such solutions have very strong positive group velocity dispersion (said group velocity dispersion being defined as $-\lambda/c\ d^2\{mode\text{-}index\}/d\lambda^2$, where c is the free-space velocity of light and λ is the free-space wavelength) as well as a very large positive group velocity dispersion slope. Such a quality is unattainable using standard optical fibre technology. It should be noted that Kawanishi et al. discloses the possibility of guided solutions with zero or near zero mode-index, however, they do not disclose the importance of such solutions- namely the large group velocity dispersion and dispersion slope. Further, the fibres disclosed in the present application, may be designed to exhibit strong negative group velocity dispersion, at a desired wavelength.

A further aspect of the designs of the present invention is that it becomes possible to have guided solutions, which consist of only one polarization. Such polarizing fibres are of interest in systems, where the polarization must be known. Polarizing fibres may also provide means of avoiding birefringence in micro-structured fibres, since small deviations from a perfect structural symmetry may create birefringence in fibres like the one disclosed in Cregan et al.

It is a further advantage of the fibres disclosed in this application that the fibres may allow guidance of light within hollow cores within larger wavelength intervals than does the fibres disclosed by Cregan et al. This is because the PBGs of the structures of the present invention may inherently extend over larger wavelength regions than does the PBGs of two-dimensional structures, like the one disclosed in Cregan et. al (considering only the wavelength regions where the PBGs cover a mode-index of unity or less). For a discussion of the wavelength intervals, where guided modes exist within a hollow core in fibres like the ones disclosed in Cregan et. al, see e.g., Broeng et al., Pure and Applied optics, 1999, pp.477–482, and "Toward the development of practical photonic crystal fibers", J. A. West, J. C. Fajardo, M. T. Gallagher, K. W. Koch, N. F. Borrelli, D. C. Allan, OSA Annual Meeting and Exhibit 2000, paper TuC1.

A further advantage of the present invention is that the fibres disclosed herein may allow guidance of light within hollow cores with a guided mode-index close to unity, within larger wavelength intervals than does the fibres disclosed by Cregan et al. This is because the PBGs of two-dimensional periodic structures are inherently smaller than the PBGs of the semi-periodic structures of the fibres of the present invention.

The present invention may be embedded in an article (which e.g., can be used in an optical fibre communication system) that comprises micro-structured fibre that is intended to guide light at a predetermined wavelength.

In a preferred embodiment, the fibre may consist of adjacent concentric circular or elliptical rings, said rings alternating such that a porous ring is adjacent to two solid rings and visa versa. Each ring consists of a dielectric material (not necessarily the same dielectric for each ring). Porous rings, furthermore, may have a large number of spaced apart features, said features consisting of a material (vacuum, air, gas, liquid, dielectric) differing from the dielectric material they are embedded within. The porous rings, therefore, may have an effective index differing from the solid rings, due to their spaced apart features.

By ensuring that the spaced apart features are small compared to the wavelength, light may see the porous rings essentially as a homogenous material, with a refractive index close to the effective or geometrical index of the porous ring. The effective or geometrical index of one or more porous rings may vary radial due to a radial variance in the placing of spaced apart features, which offers the possibility of further tailoring the variance of the radial varying effective or geometrical index. The important feature is that the radial varying effective or geometrical index allows light to be guided within a central core region (which may itself be hollow or dielectric or hollow filled with a liquid) through a photonic bandgap like effect, similar to the photonic bandgap effect responsible for the guiding in radial periodic fibres as described by Markou et. al.

If the wavelength decreases so that the wavelength and the cross section of the spaced apart cladding features may have a comparable size, light begins to sense the cladding features. As understood by those skilled in the art, this raises the effective index of the particular cladding ring. Since the cladding ring may still behave almost as having an effective or geometrical index (with e.g. near circular symmetry) in this wavelength region, it may still be possible to use the fibre as a semi periodic photonic bandgap fibre. It may therefore be an advantage of the present invention that it may allow a larger wavelength dependence of the effective or geometrical index of the cladding rings than does the prior art radial periodic fibres. This advantage can be used to tailor the group velocity dispersion of semi periodic fibres.

In another preferred embodiment the spaced apart features within the porous rings are allowed to be considerably larger. This is because the holes may be placed in a locally periodic manner, which allows the formation of photonic bandgaps in the porous rings. Light can, therefore, be reflected significantly, even though light does not sense the material of the ring as an almost homogenous material. Since the photonic bandgaps may include an effective or geometrical index of 1 or below, this may offer the possibility of having cladding rings, which in some respects acts as air. This is an advantage, since it makes it possible to have rigid low index rings, which have basic qualifies similar to a hypothetical ring of air, which hypothetical air ring would obviously lack the rigidity necessary in the final fibre.

In yet another preferred embodiment the porous rings are not circular or elliptical, but polygonal. The advantage of such an arrangement may be that the spaced apart features may be placed on a two-dimensional lattice (as long as the entire cladding structure is still not two-dimensionally periodic), and thereby increase the possibility of having photonic bandgaps in the porous layers. In another preferred embodiment the solid rings are replaced by porous rings. The rings may still have an alternating refractive index, such that each ring with low effective index is adjacent to two rings with high index. This may be obtained by having a different feature size in the two types of rings or/and by employing rings with a different background material in the two types of rings. This may result in the geometrical index or the effective index of the rings being different. Also here, the cladding rings need not be circular. The advantage of using elongated rings (elliptical, or polygons where not all side-lengths within a polygon have the same length) is that a high degree of birefringence may be obtained. Alternatively birefringence may be obtained by having elongated features within the porous rings.

To ensure that sufficiently large photonic bandgaps are obtained, the rings may have comparable radial widths. As an example, wide rings may not be more than four times wider than narrow rings.

In another preferred embodiment the effective index of the high index rings is demanded to be very much higher than low index rings. An example is a geometrical or effective index of the high index rings, which is at least 30% higher than the geometrical or effective index, respectively, of low index rings. A high effective index contrast may be a requirement in structures with large photonic bandgaps.

In another preferred embodiment the core is demanded to have a refractive index, which is below the geometrical or effective index of the low index ring, e.g. a hollow core. As understood by those skilled in the art, this may only be possible due to photonic bandgaps in the cladding structure. This does not imply that all preferred embodiments have a low refractive index core, actually another preferred embodiment has a silica glass core.

In a preferred embodiment the rings with a high effective index are placed radial periodic. However, it is an advantage that this is not a requirement. From the art of radial periodic fibres, it is well known that the best confinement of the field is obtained when the refractive index is chosen such, that the field has zero amplitude at the ring interfaces (see e.g. J.

Marcou et al). Similarly, the cladding rings of the semi-periodic fibres according to the present invention may be designed, so that the electric field has minimum amplitude at the interfaces. Since the guiding effect is still a photonic bandgap effect we will refer to such fibres as fibres with a geometrical or effective index, which varies in an essentially radial periodic manner.

DETAILED DESCRIPTION OF SOME PREFERRED EMBODIMENTS

In the proceeding text, the invention will be described by way of example using selected preferred embodiments.

Figure 1A:
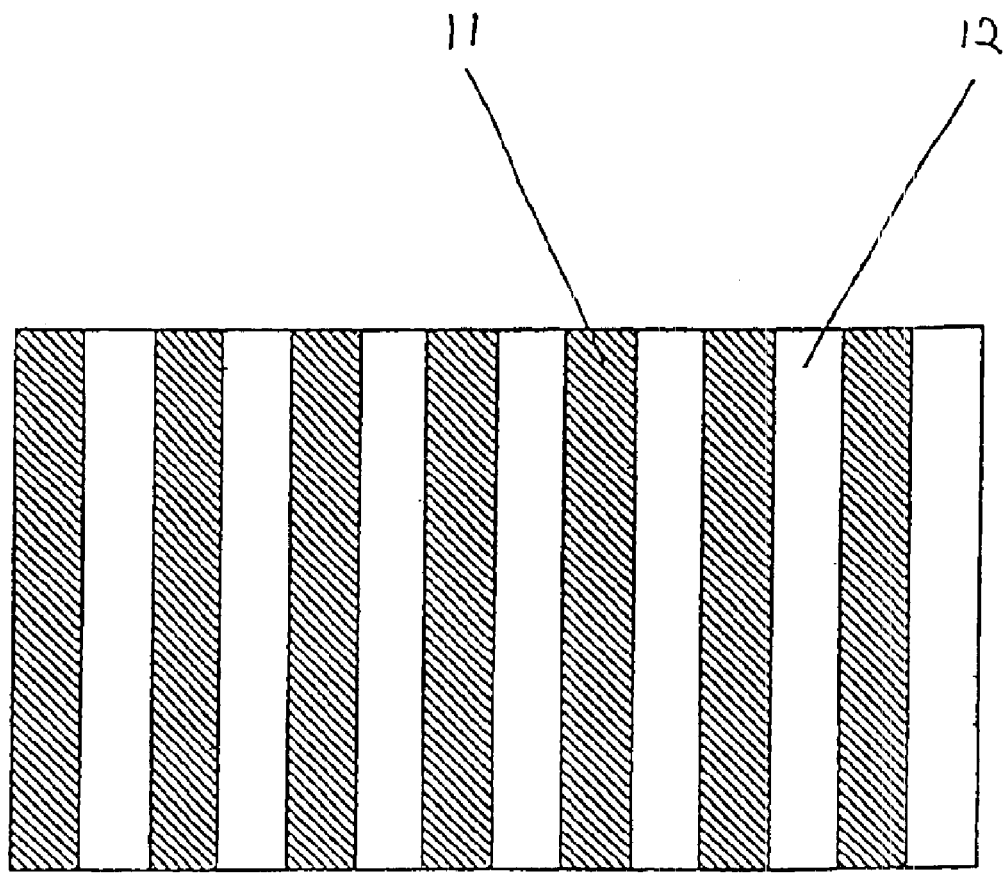
FIG. 1A illustrates a one-dimensional Bragg stack according to the prior art.

In the prior art, one-dimensional Bragg stacks as schematically shown in FIG. 1A, are known to exhibit photonic bandgaps. The Bragg stack consist of alternating layers of high index material (11) and low index material (12). Light incident directly on the stack is reflected completely by the Bragg-stack if the thickness of each layer corresponds to a quarter of a wavelength of the light. Such a Bragg stack is typically referred to as a dielectric mirror (since in principle all light is reflected), or it is termed a quarter wave stack. The wavelengths intervals, in which light is reflected are termed the photonic bandgaps of the Bragg stack at normal incidence.

Often Bragg stacks are designed for normal incidence, since the light will then not propagate in the invariant direction of the crystal. However, it is recognised that photonic bandgaps also exist for non-normal incidence (see e.g. J. Lekner et. al).

Figure 1B:
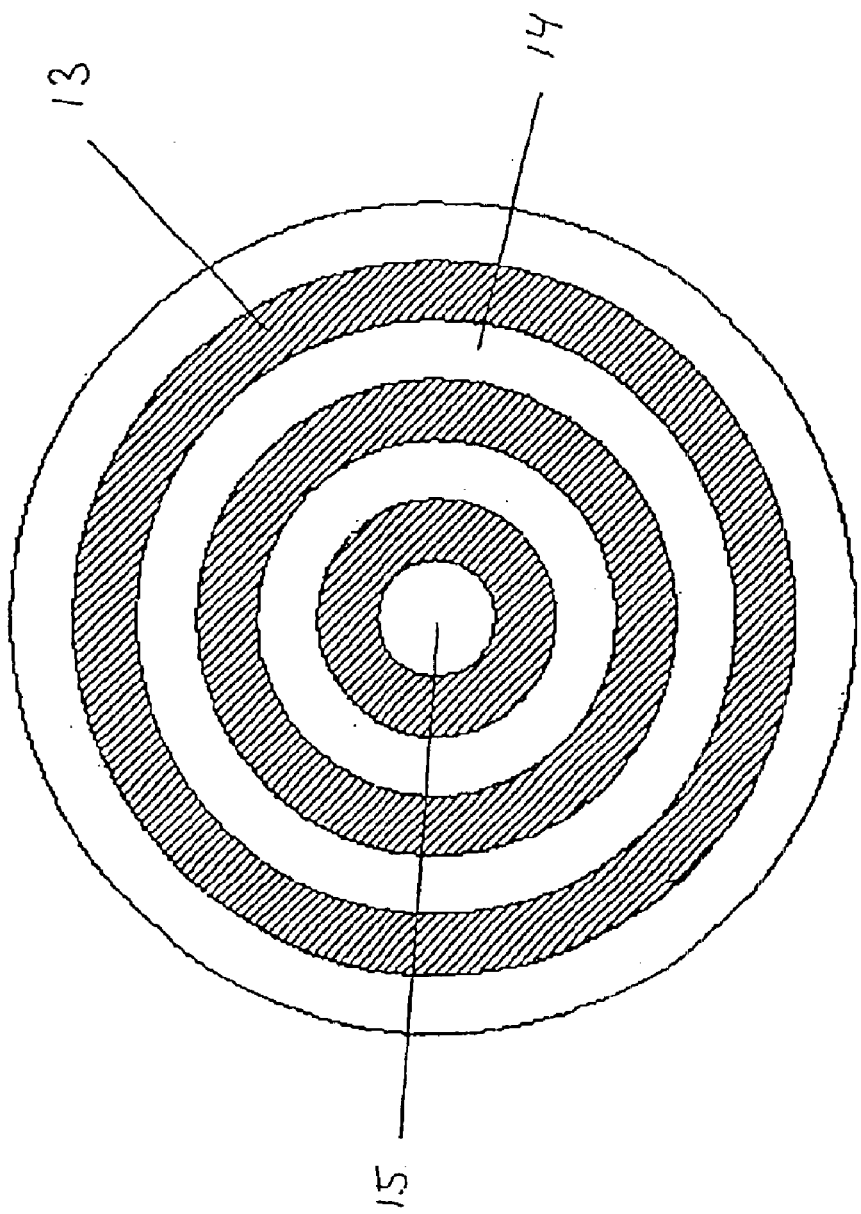
FIG. 1B illustrates the cross section of a radial periodic optical waveguide known from the prior art.

If the Bragg stack is bended such that it takes the form of concentric circles circumscribing a central core (see FIG. 1B), light at normal incidence, which is allowed in the core-region but not in the surrounding Bragg stack due to a photonic bandgap of the Bragg stack, will be trapped in the core-region (15) by so called Bragg reflection as described in e.g. Kawanishi et.al. In this application we denote such a fibre with radial alternating high index (13) and low index (14) a radial periodic fibre, since the fibre will often be designed to be almost periodic in the radial direction. In radial periodic fibres, the propagation in the invariant crystal direction (assuming non-normal incidence) can be turned into an advantage, since this allows light to propagate down the invariant axis of the fibre. In radial periodic fibres it is therefore possible to guide light, assuming non-normal incidence, or to trap the light (or stop the propagation of light) using non-normal incidence.

Figure 2A:
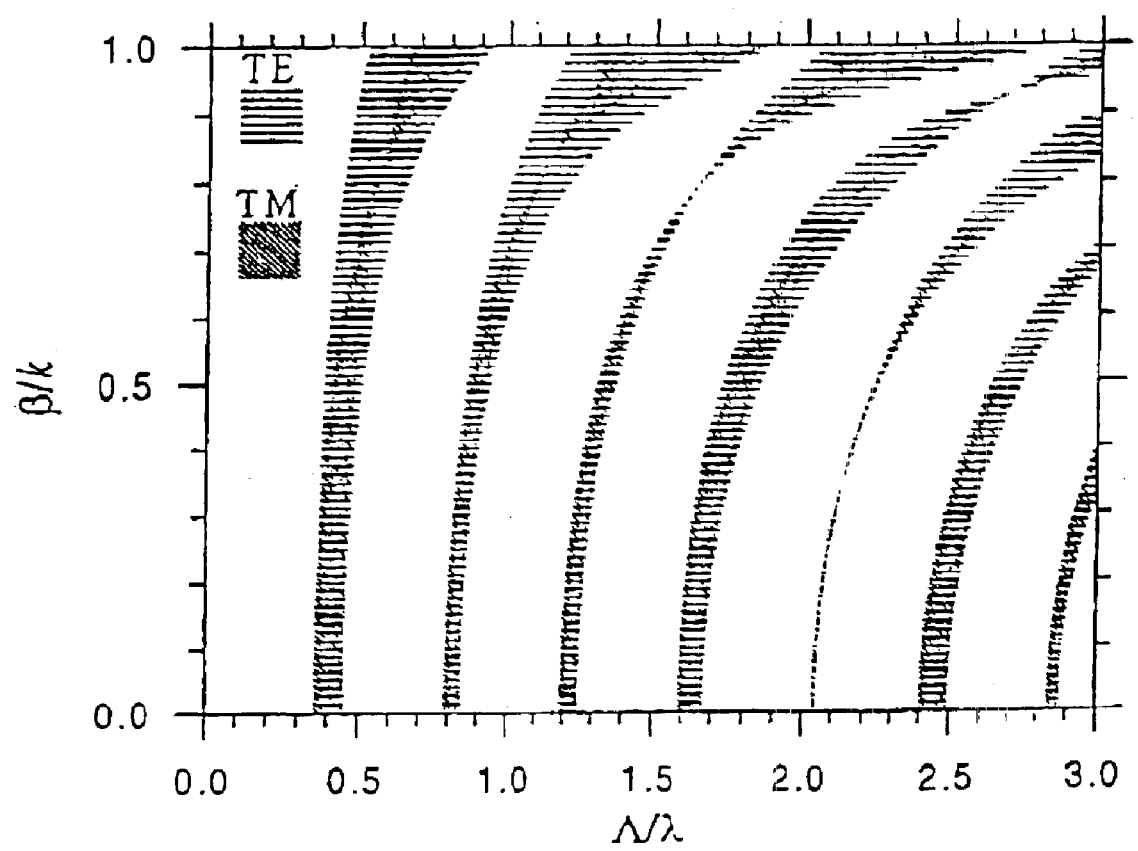
FIG. 2A shows the photonic bandgaps of a one-dimensional Bragg stack. The materials used are silica and air. This corresponds to the bandgaps of a fibre according to the present invention, when the low index rings contains almost only air.

In this application we will denote the non-normal component of the so-called wave-vector, the propagation constant, which we in FIG. 2 denote $\beta$. FIG. 2A shows the photonic band gaps of a Bragg stack consisting of layers of silica (refractive index 1.45) and layers of air (refractive index 1.0). The silica and air layers have equal thickness in this example. The bandgaps for both normal incidence ($\beta/k=0$), and for non-normal incidence ($\beta/k\neq 0$) is shown. In FIG. 2A, the photonic bandgaps are shown as forbidden mode-index intervals, $\beta/k$ intervals. The photonic bandgaps, are shown as a function of the so-called normalized frequency, $\Lambda/\lambda$. $\Lambda$ is the period of the Bragg stack (the combined thickness of on layer of silica and one layer of air), and $\lambda$ is the free-space wavelength of the light. In a hypothetical radial periodic fibre, with a silica/air cladding structure, light which lies within a photonic bandgap will not leak into the cladding, but instead be trapped to the core-region by the photonic bandgap effect (see e.g. Kawanishi et. al).

In FIG. 2A is only shown photonic bandgaps for $\beta/k\leq 1$. Photonic bandgaps also exist for $\beta/k\geq 1$, however, these are not shown, since we here wish to stress the possibility of guiding light mainly within hollow core-regions, which is only possible when $\beta/k\leq 1$. As known to those skilled in the art, guidance within other types of cores (e.g. a silica core), is possible when $\beta/k\geq 1$, as well as when $\beta/k\leq 1$.

It is a disadvantage that FIG. 2A is of theoretical interest only for radial periodic fibres, since it is not possible to make a rigid radial periodic fibre with air-rings (at least not using presently known prior art).

Figure 2B:
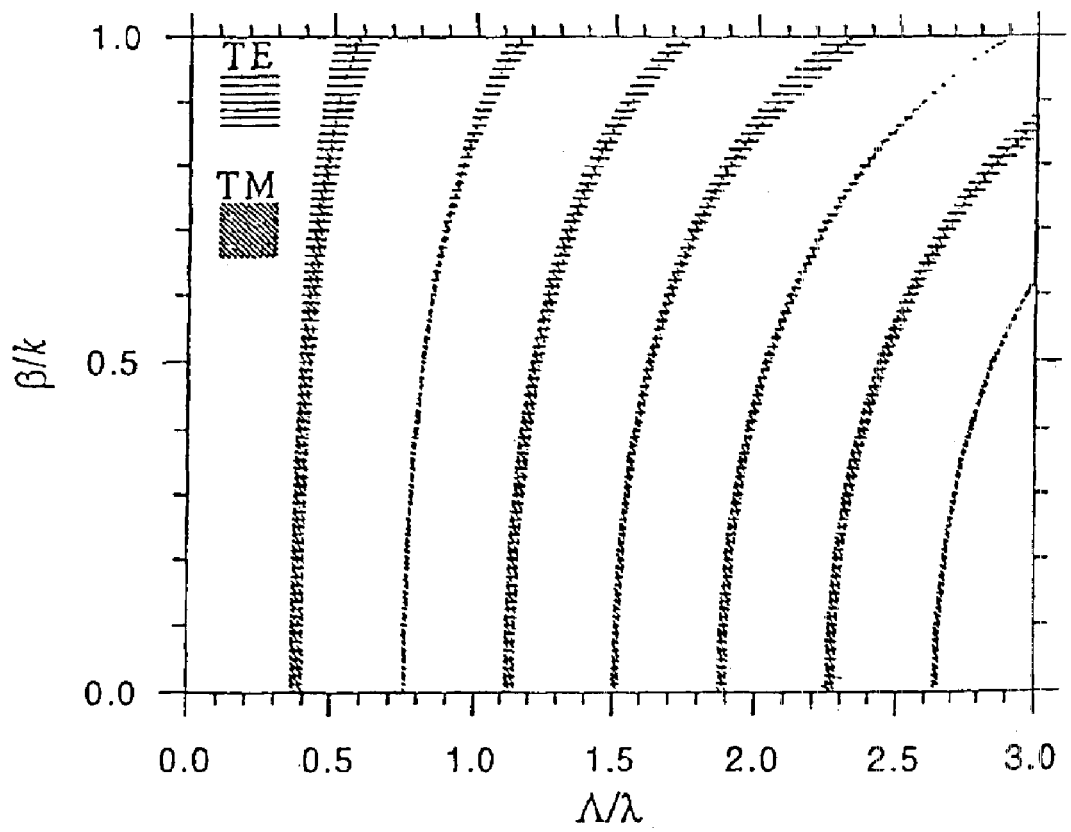
FIG. 2B shows the photonic bandgaps of a one-dimensional Bragg stack. The materials used are silica and a material with refractive index 1.2.

In FIG. 2B is shown a similar plot, however, in this case the crystal consist of silica (refractive index 1.45), and a hypothetical material with refractive index 1.2. Again photonic bandgaps exist. Even though no rigid material with refractive index 1.2 exist, the present inventors have realized a way to utilise photonic bandgaps, such as the one shown in FIG. 2B.

The present inventors have realized that it is not necessary to have a material with refractive index of 1.2. A porous material with an effective index of 1.2 is sufficient. Such a material could be created by e.g. having silica with a large number of small air holes within it. The air holes and the bridges between the air holes, should be small compared to the wavelength of light, to ensure that the porous material acts as a homogeneous material with a refractive index equal to the effective index of the material. In this case our calculations show, that the effective index is close to the geometrical index, which is the average refractive index of the porous material.

FIG. 2 therefore also illustrates the photonic bandgaps of a semi periodic fibre according to the present invention, provided the cladding features are sufficiently small compared to the wavelength of the light. Notice, that photonic bandgaps may also appear in the region where the light has a wavelength comparable to (and even slightly larger than) the feature size, however, the effective index of the cladding layers will then be wavelength dependent. This will also alter the wavelength dependence of the photonic bandgaps of the fibre, which in turn will alter the group velocity dispersion of the guided mode(s). The present invention therefore offers new possibilities within group velocity control not possible with the prior art radial periodic fibres (since radial periodic fibres do not have micro-structured rings).

Figure 3:
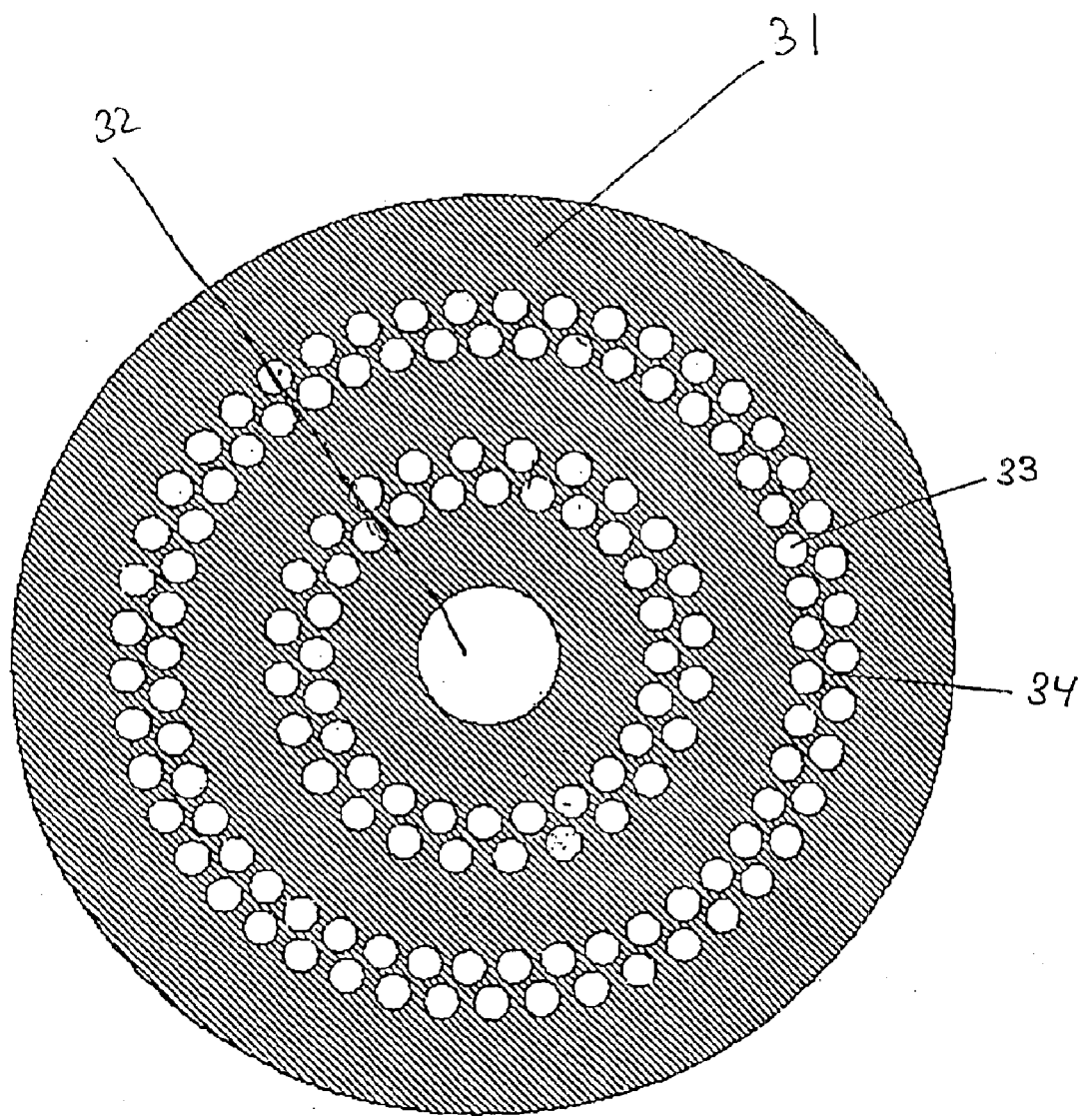
FIG. 3 shows schematically a cross section of a preferred embodiment of a semi-periodic micro-structured fibre according to the present invention.

FIG. 3 shows a schematic of a preferred embodiment of the invention. The shaded area (31) is a solid material (e.g. silica or polymer), which can be drawn into fibre. The non-shaded areas (32) and (33) denote air (or another material different from the background material). FIG. 3, therefore, corresponds to a micro-structured fibre with a hollow core (32), and alternating layers of silica (31) and porous (micro-structured) silica (34). A preform for such a structure may be made by employing silica tubes corresponding to the silica shapes (e.g. circular rings). Between the silica tubes is placed a large number of small silica tubes, which will act to form the porous layers in the final fibre. The final size of the air holes may be controlled by controlling the air pressure in the air-holes during drawing. For reasons of clarity only one air hole for each small tube is shown in FIG. 3. In a drawing process this could be obtained by using vacuum to remove the interstitial holes naturally present in the preform. Often, however, it is desirable to have as much air as possible in the porous layers of the final fibre. One may then choose to avoid removing the interstitial holes by omitting the usage of vacuum during the pulling of the fibre. Instead, the air pressure may be controlled during drawing (using e.g. pumps, or sealing one end of the preform) to maximize the air-filling fraction in the porous layers. Both techniques will be simple to use due to the silica rings, which act to air-tighten the structure during drawing of the fibre, so that air from one low effective index cladding ring can not move to another low index cladding ring during drawing.

The advantage of having a large portion of air in the porous layers is illustrated in FIG. 2. A low effective index in the porous layers give larger bandgaps, which offers the possibility of binding the field tightly to the core, as well as obtaining guidance in wide wavelength intervals. Small bandgaps, on the other hand may be an advantage when the desire is single-mode guidance within a large core region. One of the advantages of the present invention is therefore the flexibility made possible, by being able to design a porous material with a desired effective index.

Clearly, the fibre shown in FIG. 3 is not two-dimensionally periodic. It is however not random either, due to the ring-like structure. Also, the refractive index is not a radial periodic-structure. However, the effective index is almost radial periodic. To emphasize both the departure from periodic structures and random structures, we may denote the fibres of the present invention semi periodic fibres. This also helps to clarify, that effects known from periodic structures may also be found in semi-periodic fibres despite their geometric non-periodic nature. Semi periodic fibres may therefore be considered a special class of non-periodic fibres, which have an effective or a geometrical index, which is periodic, while the refractive index is non-periodic.

In a preferred embodiment the rings with a high effective index are placed radial periodic. However, it is an advantage that this is not a requirement. From the art of radial periodic fibres, it is well known that the best confinement of the field is obtained when the refractive index is chosen such, that the field has zero amplitude at the ring interfaces (see e.g. J. Marcou et al). Similarly, the cladding rings of semi-periodic fibres may be designed, so that the electric field has minimum amplitude at the interfaces. Since the guiding effect is still a photonic bandgap effect we will refer to such fibres as fibres with a geometrical (and an effective) index, which varies in an essentially radial periodic manner.

One should notice that two polarizations of photonic bandgaps exist in semi periodic fibres. In FIG. 2 they are denoted TE and TM polarizations. The importance of this is that one can design semi periodic fibres, which guide light in only one of the polarizations (a polarizing fibre). Such a polarized mode may be degenerate as a normal fibre mode, or it may be non-degenerate. Having a non-degenerate mode is an obvious way of avoiding polarization mode dispersion in optical fibres. As known to those skilled in the art polarization mode dispersion is expected to be increasingly important to overcome, as the bit rate continues to increase in future optical transmission systems.

On the other hand, the radial layers need not have the same thickness in semi periodic fibres. Varying the solid layer thickness, compared to the porous layer, offers the possibility of designing the photonic bandgaps for a given size, or for a given ratio between the TE and the TM bandgaps at a specific normalised wavelength. Those skilled in the art will recognise that the lattice constant, $\Lambda$, then offers the ability of moving the desired bandgap to a desired free space wavelength by choosing the appropriate size of $\Lambda$, which determines the structural size in the final fibre. Semi periodic fibres therefore offer great design flexibility.

Furthermore, as known from the prior art of radial periodic fibres, the thickness of the individual layers does often not vary periodically near the core region. Instead, the thickness of the layers is chosen such as to obtain maximum confinement of the field. This is done by designing the fibres such that the field intensity is near zero at the interfaces between the layers. Likewise, the preferred embodiments of the present invention are not limited to embodiments where the effective index varies in a radial periodic manner. Instead, the basic requirement is that each of the multiple low geometrical index regions is surrounded by a high geometrical index region.

Figure 4:
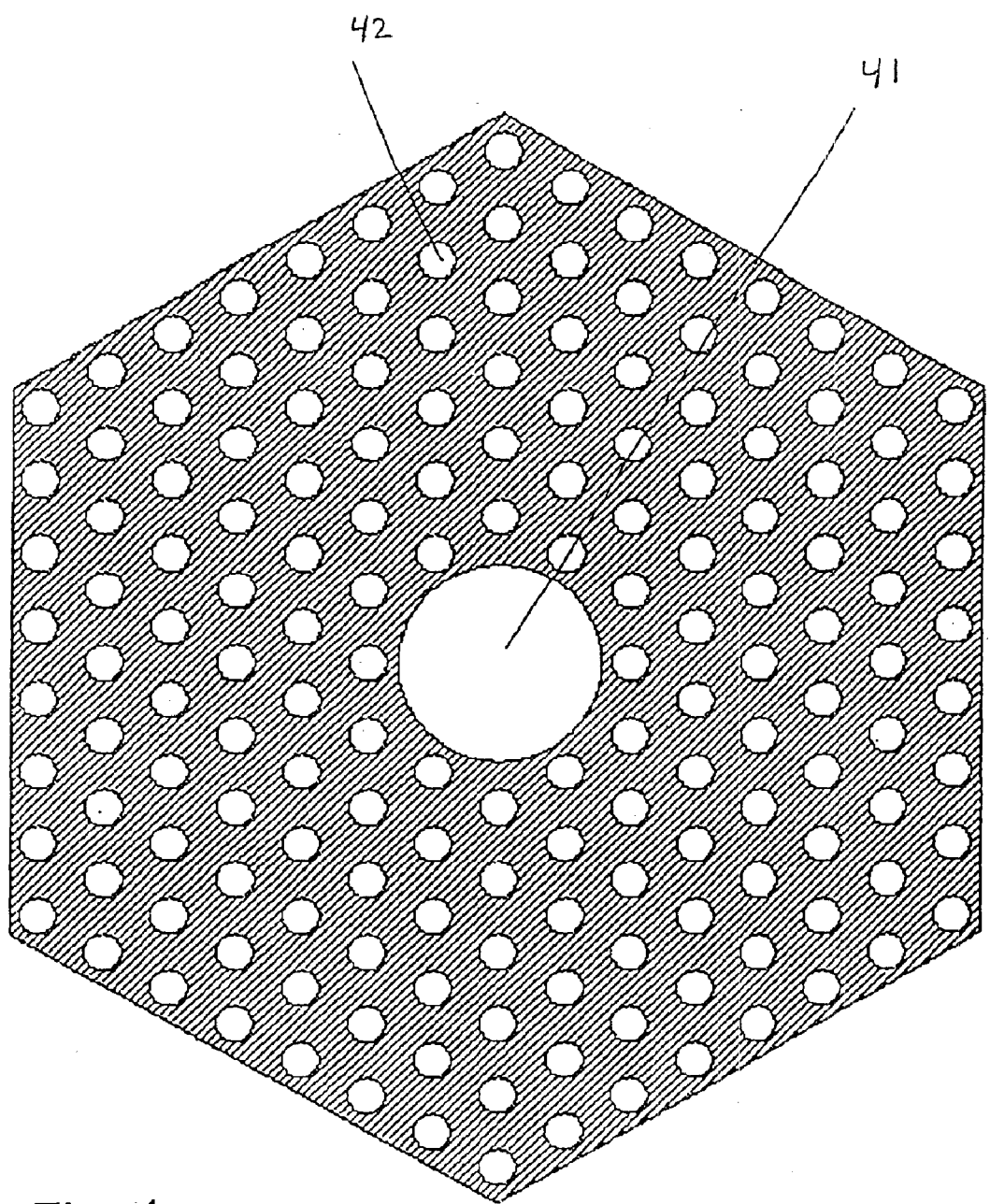
FIG. 4 shows schematically the cross section of a hollow-core micro-structured fibre according to the prior art.

In FIG. 4 is shown the schematic design of a fibre of the prior art, which is able to guide light in a hollow core (41). In the prior art the cladding air holes (42) define a two-dimensional periodic cladding structure. It is the periodicity of the structure, which allows the formation of photonic bandgaps, and thereby allows guidance of light by the photonic bandgap effect.

Figure 5:
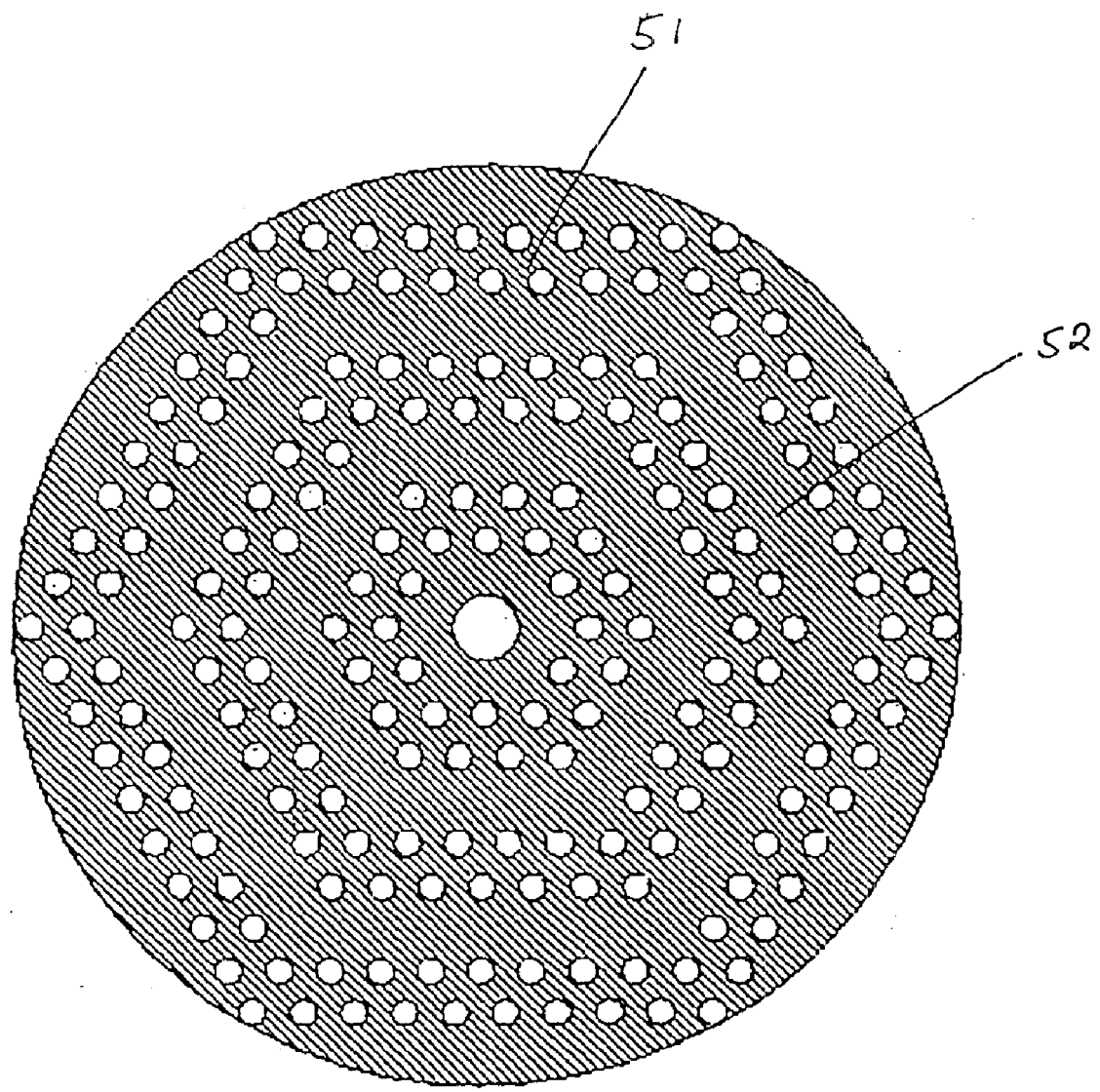
FIG. 5 schematically illustrates a cross section of a preferred embodiment of a hollow-core semi-periodic micro-structured fibre with a 60-degree symmetry according to the present invention.

In FIG. 5 is shown the design of a semi periodic fibre with hexagonal rather than circular silica rings. Again, the fibre is not two-dimensionally periodic, however, in this case it is obvious that the porous rings (51) have some periodicity within them. Those skilled in the art will recognize that the structure shown in FIG. 5 can readily be stacked and drawn. However, one might easily envision a structure where the solid silica shapes (52) have some air-holes within them, by e.g. omitting only some of the air-holes in the silica rings (compared to FIG. 4).

In preferred embodiments of the invention we may not only demand that the structure contains air holes (or similar cladding features), which clearly separates the fibre from radial periodic fibres, we may also demand that the holes are positioned in a non-periodic manner, to distinguish it from photonic crystal fibres. Also, we may demand the air holes to be positioned to yield high index and low index rings, which separates the fibres from fibres with randomly positioned holes. Last we may demand that multiple low index rings, each encompassed by a high index ring exist. This is to make photonic bandgap effects possible, and therefore also serves to distinguish the fibre from those designed for dispersion compensating purposes in e.g. EP 0 810 453 A1.

As understood by the discussion above semi periodic fibres need not have solid silica rings in the final fibre. To obtain maximum design flexibility, the silica rings may in another preferred embodiment be replaced by porous rings with an effective or geometrical index different from the effective index of the first type of porous rings. Naturally, the fibre is demanded to be non-periodic. Such semi periodic structures may readily be made with a hexagonal ring structure, however, they can also be made with circular symmetry. In this case the stacking process of the preform is more delicate, however it may be performed. The motivation for creating structures where all the cladding rings are porous, is that it allows greater flexibility in the design of photonic bandgaps.

Figure 6:
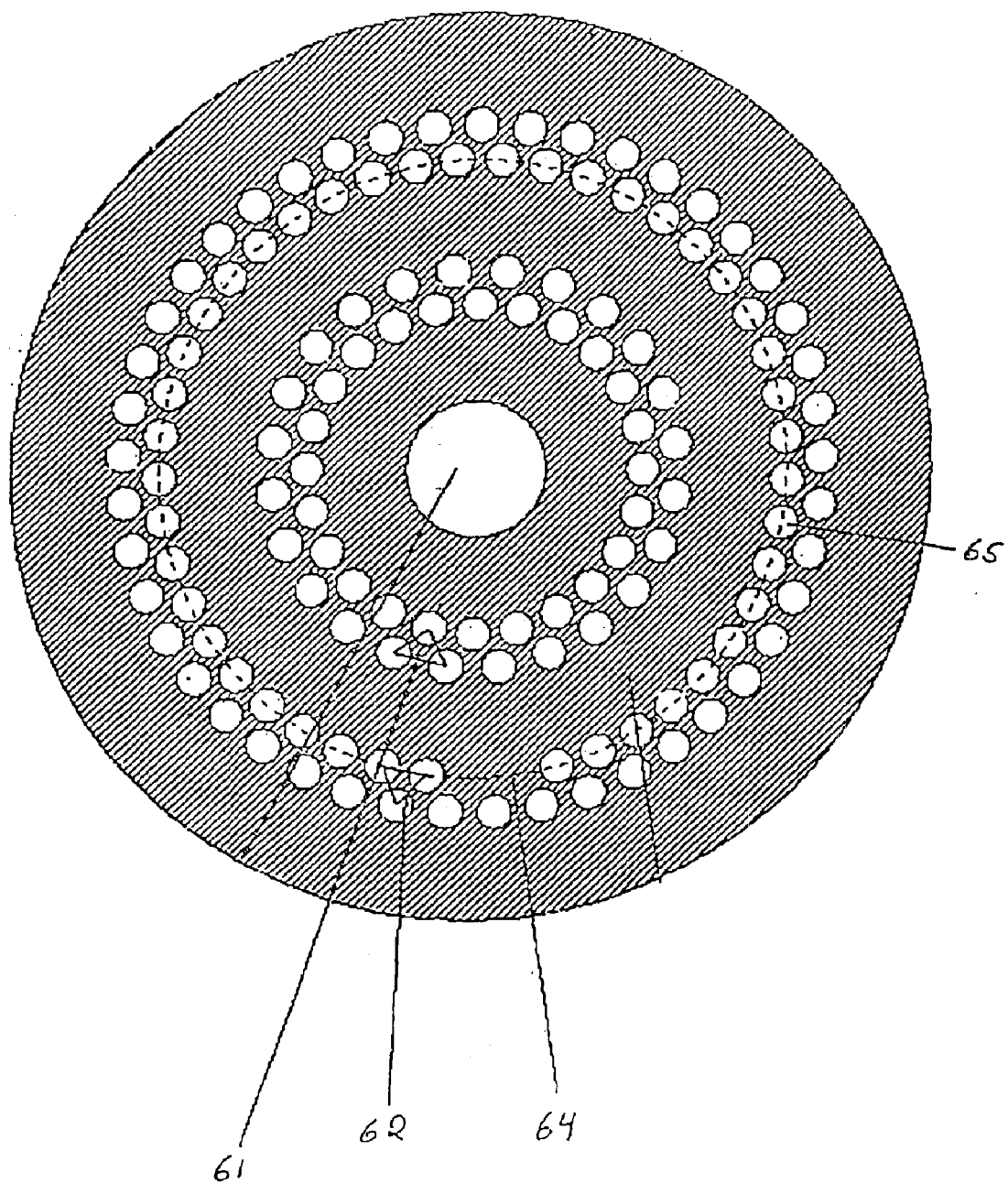
FIG. 6 schematically illustrates a cross section of a preferred embodiment of a hollow-core semi-periodic micro-structured fibre according to the present invention. The cladding features are placed on concentric circles.

Creating semi periodic fibres with hexagonal (or square) rings, offers the possibility of having rings with local periodicity of the cladding structure. This limits birefringence and allows employing photonic bandgap like effects within the rings themselves, and can act to allow cladding features, which have a size comparable to the wavelength. In this case the demand that the feature size is small compared to the wavelength, therefore, may becomes obsolete. It is therefore a natural question, whether it is possible to have rings with a circular symmetry, which have locally two-dimensionally periodic cladding structures? This may be possible, as shown in FIG. 6. Here the triangles (61) and (62) show that the structure is locally periodic, provided the features are placed on concentric circles (64). This may therefore be another preferred embodiment. By comparing the side-lengths of the triangles (61) and (62) it may be recognised that the many cladding features (65) around a circle (64) yields triangles with almost equal side lengths. This is an advantage, since it is known from the prior art, that triangular lattice structures may provide reasonably wide photonic bandgaps. Notice that a few cladding features (65) have been removed from the schematic FIG. 6 for reasons of clarity. The real structure is of course attempted to have a circular symmetry of the effective index.

One advantage of fibres with circular symmetry is that the field solutions then have circular symmetry as well. This is an advantage, since optical fibres of today have circular symmetry. Further, fibres with circular symmetry do not have angles where special care must be taken to avoid that the field escapes (such as e.g. the corners of the hexagonal rings in FIG. 5). Further, placing the cladding features on concentric circles may be used to control the birefringence of the fibre.

Other preferred embodiments have elongated rings (e.g. ellipses). This offers the possibility of birefringence control, and may be an advantage for fibres to be used in e.g. polarization preserving systems. Another way of controlling polarisation mode dispersion in semi periodic fibres is to use elongated holes in the cladding and/or core region. One may also elongate the core region, or form a core region with a centre differing from the centre of the concentric cladding rings.

Also the background material (e.g. 52) need not be the same in the whole structure. A preferred embodiment forms the radial varying index, not by changing the size of a number of air holes in the rings, but by changing the background material. The advantage compared to radial periodic fibres is In this case that the air holes are used to design the effective index of each ring, rather than to create a large index contrast. Other preferred embodiments vary both the air holes and the background index to obtain maximum flexibility in the design process.

Other preferred embodiment use dopants in the core region to enhance nonlinear effects in the fibre. This will typically be employed when the semi periodic fibre has a dielectric core (e.g. silica). The possibilities are well known from the prior art of standard optical fibres and includes processes such as the Kerr effect, four wave mixing, photo sensitivity, parametric amplification, self-phase modulation, cross phase modulation, parametric creation of light at new wavelengths (lasing) and many more. Enhanced non-linear effects may also be obtained within hollow core(s) by introducing a nonlinear gas or liquid into the core.

One process deserves special attention, however. From the theory of four wave mixing it is well known that a process of third harmonic generation is possible. Third harmonic generation involves sending in light at one frequency, $\omega$, and extracting generated light at the third harmonic frequency, $3\omega$, The process can also be reversed, such that light at the frequency $3\omega$ is sent into the fibre, and lighter extracted at the frequency $\omega$. Such a process is very much desired for the creation of new powerfull, small and relatively inexpensive blue light frequency or UV light frequency lasers. The reversed process could be used to create new infrared lasers. Such lasers can be used for Mid infrared spectroscopy, as understood by those skilled in the art, since the fundamental vibrational transition of most environmentally important gases and pollutants lie in the 2–20 $\mu$m range. The absorption spectrum therefore provides a unique "fingerprint" of the gases. Such infrared lasers could therefore be used in mid infrared spectroscopy to obtain a real time method for the detection of gases and their concentration. The process is very inefficient in standard optical fibres, since it is difficult to obtain conservation of photon momentum in the process. In semi periodic fibres, however, it should- be possible to obtain third harmonic generation.

To obtain efficient third order generation (or the reversed process), one needs a semi periodic fibre with equal mode-index at $\omega$ and $3\omega$. Furthermore, as understood by those skilled in the art, the modes should have a good modal overlap. Since the refractive index grows with the frequency, the refractive index of both the core and the cladding grows with frequency in standard optical fibres. As a result the mode Index of the guided modes also grows with the frequency, making it difficult to obtain efficient third harmonic generation in standard optical fibres.

In fibres with photonic bandgaps the refractive index (or the effective index if the core region is micro structured) of the core region also grows with frequency. However, since different photonic bandgaps may be used in different frequency regions, one can obtain that the effective cladding index (the lower bandgap edge for photonic bandgap guidance) at the frequency $3\omega$ can be equal to (or even lower) than the effective cladding index at the frequency $\omega$. This makes it possible to obtain a mode index of the guided mode at $3\omega$, which is equal to the mode index of the guided mode at the frequency $\omega$. Notice that this is only possible if the guided mode at the frequency $3\omega$ is a photonic bandgap mode, whereas the guided mode at the frequency $\omega$ can be either an index guided mode (similar to the index guided modes in the prior art micro-structured fibres- see e.g. Monro et. al.), or a photonic bandgap mode. Since semi periodic fibres are photonic bandgap fibres, it is possible to obtain efficient third order harmonic generation using semi periodic fibres—since our calculations show that guided modes within different photonic bandgaps can have a good modal overlap.

To see that this is possible in semi periodic fibres consider the photonic bandgaps shown in FIG. 2A. The demand for a mode with equal photon energy and momentum at $\omega$ and $3\omega$ is an equal mode index, $\beta/k$ at $\omega$ and $3\omega$. Since the guided mode must lie within a photonic bandgap of the structure, the basic requirement is that a photonic bandgap covers the same mode-index at $\omega$ and $3\omega$. As an example, consider the mode index, $\beta/k=1$. Then a photonic bandgap exist both at the frequency 0.8 $\Lambda/\lambda$, and at the tripled frequency 2.4 $\Lambda/\lambda$. It should therefore be possible to obtain third harmonic generation in semi periodic fibres with a non-linear gas within a hollow core region.

Actually, one will often desire a mode-index well above 1 (e.g. 1.4) to make it simpler to obtain third order generation (or the reversed process) within a dielectric core region—e.g. a silica core doped with a material which enhances the $\chi^3$ processes responsible for the third harmonic generation generation. Fortunately, our calculations show that this is also possible using semi periodic fibre. To obtain a suitable core region it may then be advantageous to microstructure the core region as well, to obtain a lower effective core-index.

Using a mode index above 1, it also becomes possible to have light at the frequency $\omega$ guided by an effect similar to total internal reflection such as described in the prior art of micro structured fibre (see e.g. Monro et. al). Light at the frequency $3\omega$ is then guided within a photonic bandgap of the semi periodic cladding structure as before. This increases the flexibility of the method, and can sometimes lead to more efficient third harmonic generation, due to smaller effective mode-areas.

Figure 7:
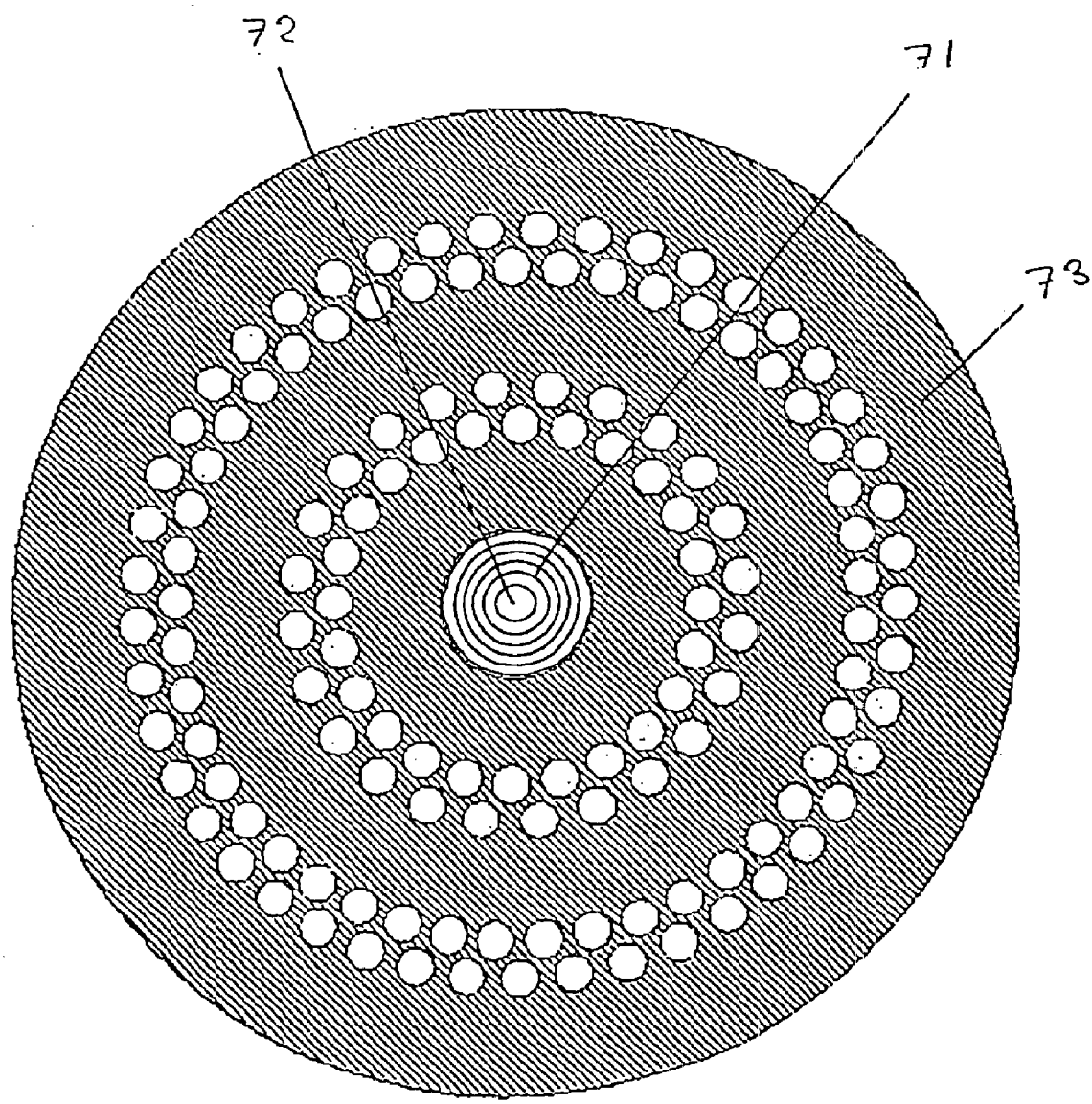
FIG. 7 illustrates the mode field distribution of a guided mode within a hollow-core semi-periodic micro-structured fibre according to the present invention.

In FIG. 7 is shown calculated contour plots (71) within a hollow core region (72) of a semi periodic fibre (73). The contour plots illustrate that it is possible to guide light within a hollow core region in a semi periodic fibre. It further illustrates that the field has circular symmetry. Notice, that for reasons of clarity a cladding structure with less air than the structure calculated upon is shown.

Figure 8:
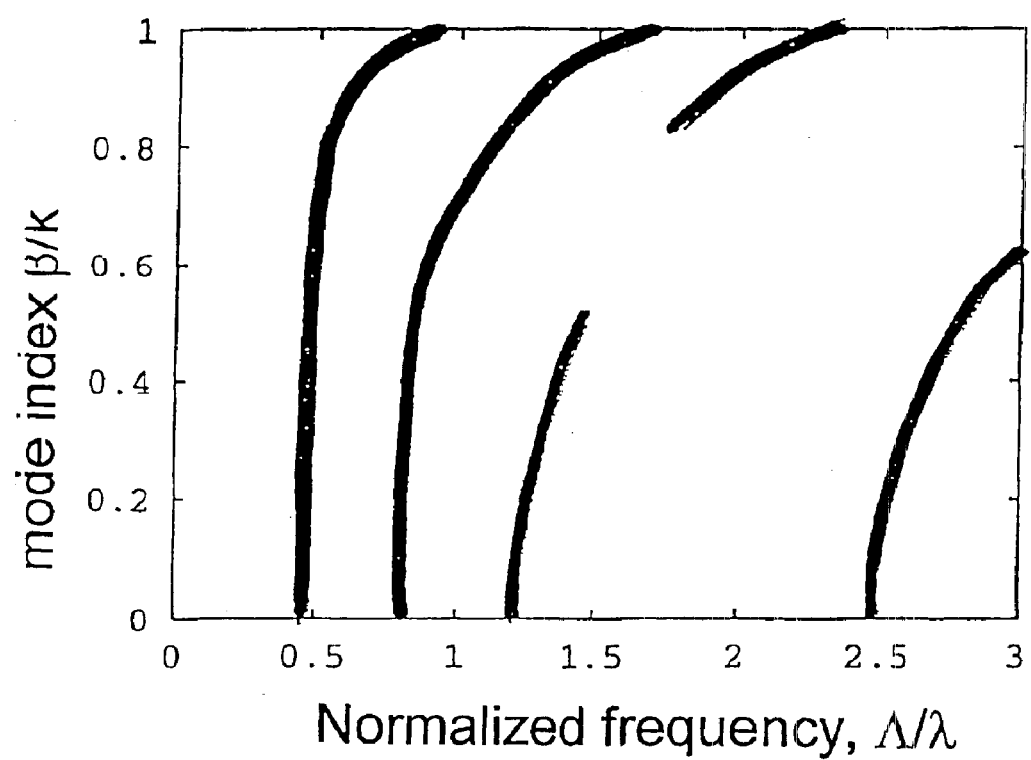
FIG. 8 illustrates a band diagram for a hollow-core semi-periodic micro-structured fibre according to the present invention.

FIG. 8 illustrates how the mode-index of the guided modes can behave in a semi periodic fibre. Only some of the guided modes are shown. Notice that the guidance is within limited wavelength intervals, due to the limited intervals of the photonic bandgaps (se e.g. FIG. 2A).

Figure 9:
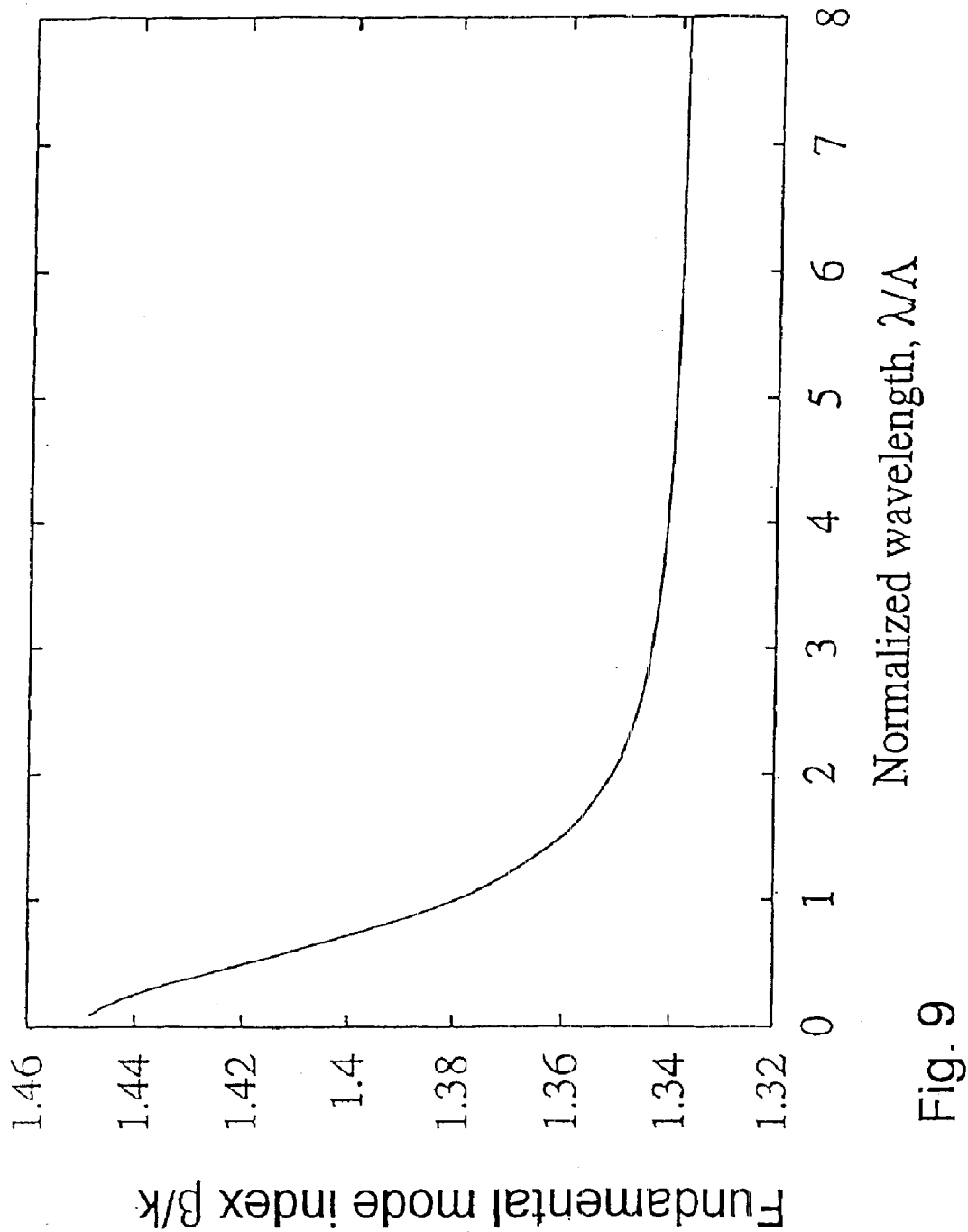
FIG. 9 illustrates the effective refractive index as a function of the reciprocal wavelength-normalised pitch for a triangular micro-structured cladding section.

FIG. 9 illustrates the effective index of the fundamental space filling modes as a function of the normalized wavelength, $\lambda/\Lambda$, for a silica structure with air holes. When the normalised wavelength is large, the mode index becomes almost independent of wavelength. This is evidence that the structure is sensed by light as an effective material, rather than a micro structured material.

What is claimed is:

1. An optical fibre for transmitting light, said optical fibre having an axial direction and a cross-section perpendicular to said axial direction, said optical fibre comprising:
   a core region, and
   a micro-structured cladding surrounding said core region, wherein the cladding comprises a number of successive concentric cladding regions encompassing said core region, each of said concentric cladding regions having inner and outer boundaries of substantially similar cross-sectional shape and a substantially constant background refractive index, a first plurality of the concentric cladding regions being of a low index type, each of said first cladding regions comprising a plurality of spaced apart first cladding features elongated in the fibre axial direction, each of said first cladding feature having a refractive index being lower than the background refractive index of the cladding region comprising the cladding feature, and each said first cladding feature having a largest cross-sectional dimension being smaller than or equal to the distance between the inner and the outer boundary of the cladding region comprising the cladding feature, whereby the geometrical index of a cladding region of the first type is lowered, a second plurality of the concentric cladding regions being of a high index type having a geometrical index being higher than the geometrical index of each of the first plurality of cladding regions, said high index type and low index type cladding regions being alternating arranged so that each low index region at its outer boundary is encompassed by a high index region, and wherein the arrangement of cladding features in relation to the micro-structured cladding as a whole is a non-periodic arrangement in the cross-sectional plane.

2. An optical fibre according to claim 1 wherein the largest cross-sectional dimension of any one of the spaced apart cladding features is smaller than a predetermined wavelength to be guided by said fibre.

3. An optical fibre according to claim 2 wherein the ratio of said largest cross-sectional dimension divided by said predetermined wavelength is below 0.8, such as below 0.6, such as below 0.5, such as below 0.4, such as below 0.3, such as below 0.2, such as below 0.1.

4. An optical fibre according to claim 1 wherein any distance L from the inner boundary of a high index region to the outer boundary of a following low index region taken along a radial direction in the cross-sectional plane is larger than or equal to a minimum length Lmin and below or equal to a maximum length Lmax, where Lmax is two times Lmin.

5. An optical fibre according to claim 1 wherein at least 6 spaced apart high index type cladding regions each have a radial width being larger than half the wavelength of a predetermined wavelength of light to be guided by the fibre, while said radial width is smaller than the predetermined wavelength of light to be guided by the fibre.

6. An optical fibre according to claim 1 wherein at least 6 spaced apart high index type cladding regions each have a radial width being larger than 0.5 $\mu$m, such as larger than 0.6 $\mu$m, such as larger than 0.7 $\mu$m, such as larger than 0.8 $\mu$m, such as larger than 0.9 $\mu$m, such as larger than 1.0 $\mu$m, as larger than 1.1 $\mu$m, such as larger than 1.2 $\mu$m, such as larger than 1.3 $\mu$m.

7. An optical fibre according to claim 1 manufactured for guidance of light with a predetermined wavelength, $\lambda$, said guided light having an effective mode index, $\beta/k$, where $\beta$ is the propagation constant of the guided mode, and where k is the free-space wave number of said predetermined wavelength, wherein for each of at least 6 spaced apart high index type cladding regions the radial width is in the range of 0.9–1.1 times $$\frac{(1+2m)\frac{\lambda}{4}}{\sqrt{n_{\text{eff\_high}}^2 - \left(\frac{\beta}{k}\right)^2}},$$

where $n_{\text{eff\_high}}$ is the effective refractive index of the corresponding high index type cladding region, and m is zero or a predetermined whole positive number.

8. An optical fibre according to claim 7 wherein for each of said at least 6 spaced apart high index type cladding regions the radial width is approximately equal to $$\frac{(1+2m)\frac{\lambda}{4}}{\sqrt{n_{\text{eff\_high}}^2 - \left(\frac{\beta}{k}\right)^2}},$$

where $n_{\text{eff\_high}}$ is the effective refractive index of the corresponding high index type cladding region, and m is zero or a predetermined whole positive number.

9. An optical fibre according to claim 1 manufactured for guidance of light with a predetermined wavelength, $\lambda$, said guided light having an effective mode index, $\beta/k$, where $\beta$ is the propagation constant of the guided mode, and where k is the free-space wave number of said predetermined wavelength, in which for each of at least 6 spaced apart high index type cladding regions the radial width is in the range of 0.9–1.1 times $$\frac{(1+2m)\frac{\lambda}{4}}{\sqrt{n_{\text{ge\_high}}^2 - \left(\frac{\beta}{k}\right)^2}},$$

where $n_{\text{ge\_high}}$ is the geometrical index of the corresponding high index type cladding region, and m is zero or a whole positive number.

10. An optical fibre according to claim 9 wherein for each of said at least 6 spaced apart high index type cladding regions the radial width is approximately equal to $$\frac{(1+2m)\frac{\lambda}{4}}{\sqrt{n_{\text{ge\_high}}^2 - \left(\frac{\beta}{k}\right)^2}},$$

where $n_{\text{ge\_high}}$ is the geometrical index of the corresponding high index type cladding region, and m is zero or a whole positive number.

11. An optical fibre according to claim 7 wherein the number m is the same for each of said at least 6 spaced apart high index type cladding regions.

12. An optical fibre according to claim 7 wherein for each of said at least 6 spaced apart high index type cladding regions m is selected from the numbers 0, 1, 2 or 3.

13. An optical fibre according to claim 7 wherein a first part of the spaced apart high index type cladding regions has a radial width according to a first value of the number m, while a second part of the high index type cladding regions has a radial width according to a second value of the number m.

14. An optical fibre according to claim 13 wherein said first value of m is larger than said second value of m, and said first part of high index type cladding regions are arranged closer to the core region than said second part of high index type cladding regions.

15. An optical fibre according to claim 1 manufactured for guidance of light with a predetermined wavelength, λ, said guided light having an effective mode index, β/k, where β is the propagation constant of the guided mode, and where k is the free-space wave number of said predetermined wavelength, wherein for each of at least 6 spaced apart low index type cladding regions the radial width is in the range of 0.9–1.1 times $$\frac{(1+2m)\frac{\lambda}{4}}{\sqrt{n_{\text{eff\_low}}^2 - \left(\frac{\beta}{k}\right)^2}},$$

where $n_{\text{eff\_low}}$ is the effective refractive index of the corresponding low index type cladding region, and m is zero or a predetermined whole positive number.

16. An optical fibre according to claim 15 wherein for each of said at least 6 spaced apart low index type cladding regions the radial width is approximately equal to $$\frac{(1+2m)\frac{\lambda}{4}}{\sqrt{n_{\text{eff\_low}}^2 - \left(\frac{\beta}{k}\right)^2}},$$

where $n_{\text{eff\_low}}$ is the effective refractive index of the corresponding low index type cladding region, and m is zero or a predetermined whole positive number.

17. An optical fibre according to claim 1 manufactured for guidance of light with a predetermined wavelength, λ, said guided light having an effective mode index, β/k, where β is the propagation constant of the guided mode, and where k is the free-space wave number of said predetermined wavelength, in which for each of at least 6 spaced apart low index type cladding regions the radial width is in the range of 0.9–1.1 times $$\frac{(1+2m)\frac{\lambda}{4}}{\sqrt{n_{\text{ge\_low}}^2 - \left(\frac{\beta}{k}\right)^2}},$$

where $n_{\text{ge\_low}}$ is the geometrical index of the corresponding low index type cladding region, and m is zero or a whole positive number.

18. An optical fibre according to claim 17 wherein for each of said at least 6 spaced apart low index type cladding regions the radial width is approximately equal to $$\frac{(1+2m)\frac{\lambda}{4}}{\sqrt{n_{\text{ge\_low}}^2 - \left(\frac{\beta}{k}\right)^2}},$$

where $n_{\text{ge\_low}}$ is the geometrical index of the corresponding low index type cladding region, and m is zero or a whole positive number.

19. An optical fibre according to claim 15 wherein the number m is the same for each of said at least 6 spaced apart low index type cladding regions.

20. An optical fibre according to claim 15 wherein for each of said at least 6 spaced apart low index type cladding regions m is selected from the numbers 0, 1, 2 or 3.

21. An optical fibre according to claim 15 wherein a first part of the spaced apart low index type cladding regions has a radial width according to a first value of the number m, while a second part of the low index type cladding regions has a radial width according to a second value of the number m.

22. An optical fibre according to claim 1 wherein at least 6 spaced apart low index type cladding regions each have a radial width being larger than a predetermined wavelength of light to be guided by the fibre, while said radial width is smaller than three times the predetermined wavelength of light to be guided by the fibre.

23. An optical fibre according to claim 1 wherein at least 6 spaced apart low index type cladding regions each have a radial width being larger than 1.5 μm, such as larger than 2.0 μm, such as larger than 2.5 μm, such as larger than 3.0 μm, such as larger than 3.5 μm, such as larger than 4.0 μm, such as larger than 4.5 μm.

24. An optical fibre according to claim 4 wherein the cladding regions are dimensioned so that any value of L taken along any radial direction is larger than 2 times, such as larger than 3 times, such as larger than 4 times a predetermined wavelength to be guided by said fibre.

25. An optical fibre according to claim 2 wherein said predetermined wavelength is in the range of 1.4–1.6 μm, such as around 1.55 μm.

26. An optical fibre according to claim 1 wherein each of the second plurality of concentric cladding regions are made of a solid material with no cladding features.

27. An optical fibre according to claim 26 wherein each of said second plurality of cladding regions is made of a solid material having a substantially constant refractive index.

28. An optical fibre according to claim 1 wherein at least one of said second cladding regions comprises a plurality of spaced apart second cladding features elongated in the fibre axial direction, each said second cladding feature having a refractive index being different from the background refractive index of the cladding region comprising the cladding feature, and each said second cladding feature having a largest cross-sectional dimension being smaller than or equal to the distance between the inner and the outer boundary of the cladding region comprising the cladding feature.

29. An optical fibre according to claim 28 wherein each said second cladding features has a refractive index being lower than the background refractive index of the cladding region comprising the cladding feature.

30. An optical fibre according to claim 28 wherein the first cladding features for each of said first cladding regions occupy a ratio of the area of the first cladding region being larger than or equal to a minimum ratio Fcl1, the second cladding features for each of said second cladding regions occupy a ratio of the area of the second cladding region being smaller than or equal to a maximum ratio Fcl2, and Fcl2 is smaller than Fcl1.

31. An optical fibre according to claim 30 wherein the first cladding features and the second cladding features have substantially the same refractive index.

32. An optical fibre according to claim 28 wherein the first cladding features and the second cladding features have substantially the same cross-sectional dimensions.

33. An optical fiber according to claim 28 wherein each said second cladding features has a refractive index being higher than the background refractive index of the cladding region comprising the cladding feature.

34. An optical fibre according to claim 1 wherein the spaced apart first cladding features within a given first cladding region are spaced at substantially equal distances.

35. An optical fibre according to claim 1 wherein the first cladding features are arranged in a locally two-dimensionally periodic structure within each or at least part of said first cladding regions.

36. An optical fibre according to claim 1 wherein the spaced apart second cladding features within a given second cladding region are at substantially equal distances.

37. An optical fibre according to claim 1 wherein the second cladding features are arranged in a locally two-dimensionally periodic structure within each or at least part of said second cladding regions.

38. An optical fibre according to claim 1 wherein the shape of the inner and outer boundaries of the cladding regions is substantially circular or elliptical.

39. An optical fibre according to claim 38 wherein the centres of the plurality of spaced apart first cladding features are arranged essentially on concentric circles or ellipses within said first cladding regions.

40. An optical fibre according to claim 38 wherein the centres of the plurality of spaced apart second cladding features are arranged essentially on concentric circles or ellipses within said second cladding regions.

41. An optical fibre according to claim 1 wherein the centres of the plurality of spaced apart first cladding features are arranged essentially at even distances within each or at least part of said first cladding regions.

42. An optical fibre according to claim 1 wherein the centres of the plurality of spaced apart second cladding features are arranged essentially at even distances within each or at least part of said second cladding regions.

43. An optical fibre according to claim 1 wherein the shape of the inner and outer boundaries of the cladding regions is substantially polygonal.

44. An optical fibre according to claim 43 wherein the centres of the plurality of spaced apart first and/or second cladding features are arranged essentially on concentric polygons.

45. An optical fibre according to claim 1 wherein the core region comprises a hollow core.

46. An optical fibre according to claim 1 wherein the ratio of the radial widths of the radial widest and the radial most narrow of the concentric cladding regions is less than 4, such as less than 3, such as less than 2, such as less than 1.5, such as less than 1.2, such as less than 1.1.

47. An optical fibre according to claim 1 wherein each of the concentric cladding regions has the same background refractive index.

48. An optical fibre according to claim 1 wherein the background material of at least one of the concentric cladding regions is a dielectric material such as silica with a refractive index in the range of 1.43 to 1.49, such as around 1.45.

49. An optical fibre according to claim 1 wherein the center of any of the spaced apart cladding features is situated near the center of another spaced apart cladding feature at a distance smaller than 5.0 µm, such as smaller than 2.0 µm, such as smaller than 1.0 µm, such as smaller than 0.7 µm, such as smaller than 0.4 µm, such as smaller than 0.2 µm, such as smaller than 0.1 µm.

50. An optical fibre according to claim 1 wherein the largest cross-sectional dimension of any one of the spaced apart cladding features is smaller than 5.0 µm, such as smaller than 2.0 µm, such as smaller than 1.0 µm, such as smaller than 0.7 µm, such as smaller than 0.4 µm, such as smaller than 0.2 µm, such as smaller than 0.1 µm.

51. An optical fibre according to claim 1 wherein the value of the radial widest width of any of the cladding regions divided by a predetermined wavelength to be guided by the fibre is less than 3.0, such as less than 2.0, such as less than 1.5, such as less than 1.0, such as less than 0.5, such as less than 0.3.

52. An optical fibre according to claim 1 wherein the spaced apart cladding features are voids.

53. An optical fibre according to claim 1 wherein the spaced apart cladding features contain air or another gas, or contain water, oil, gasoline or another liquid.

54. An optical fibre according to claim 1 wherein each of the first plurality of low index cladding regions has a geometrical index being lower than 1.25, such as lower than 1.2, such as lower than 1.15, such as lower than 1.1, such as lower than 1.05.

55. An optical fibre according to claim 1 wherein the geometrical index of the high index cladding region with the lowest geometrical index is more than 5% larger than the geometrical index of the low index cladding region with the highest geometrical index, such as more than 10% larger, such as more than 20% larger, such as more than 25% larger, such as more than 30% larger, such as more than 35% larger, such as more than 40% larger, such as more than 45% larger.

56. An optical fibre according to claim 45 wherein the hollow core region contains a vacuum, air or another gas, or contains a liquid.

57. An optical fibre according to claim 1 wherein the core region contains a dielectric, such as silica glass.

58. An optical fibre according to claim 57 wherein the core region comprises a dielectric such as silica glass doped with a substance selected from the group consisting of erbium, ytterbium, neodymium, thulium and praseodymium.

59. An optical fibre according to claim 57 wherein the core region comprises silica glass having a dopant selected from the group consisting of germania, alumina, phosphorus, titania, boron and fluorine.

60. An optical fibre according to claim 1 wherein the core region has a largest cross-sectional dimension being larger than 1 µm, such as larger than 2 µm, such as larger than 4 µm, such as larger than 8 µm, such as larger than 15 µm, such as larger than 30 µm.

61. A method of using an optical fibre according to claim 1 in a process involving third order harmonic generation or the reversed process.

* * * * *